United States Patent
Johnson

(10) Patent No.: US 11,134,805 B1
(45) Date of Patent: Oct. 5, 2021

(54) COLD BREWING SYSTEM AND METHOD

(71) Applicant: OFF THE BEATEN PATH COFFEE LLC, Dublin, OH (US)

(72) Inventor: Stephen B. Johnson, Dublin, OH (US)

(73) Assignee: OFF THE BEATEN PATH COFFEE, LLC, Dublin, OH (US)

( * ) Notice: Subject to any disclaimer, the term of this patent is extended or adjusted under 35 U.S.C. 154(b) by 326 days.

(21) Appl. No.: 16/158,946

(22) Filed: Oct. 12, 2018

Related U.S. Application Data

(60) Provisional application No. 62/572,009, filed on Oct. 13, 2017.

(51) Int. Cl.
| | |
|---|---|
| A47J 31/053 | (2006.01) |
| A47J 31/44 | (2006.01) |
| A47J 31/52 | (2006.01) |
| B67D 1/04 | (2006.01) |
| A23F 5/24 | (2006.01) |
| A23L 2/56 | (2006.01) |
| A23L 2/76 | (2006.01) |
| A23L 2/52 | (2006.01) |
| A23L 2/72 | (2006.01) |
| A23L 2/54 | (2006.01) |
| A23F 5/26 | (2006.01) |

(52) U.S. Cl.
CPC .............. *A47J 31/053* (2013.01); *A23F 5/24* (2013.01); *A23F 5/262* (2013.01); *A23L 2/52* (2013.01); *A23L 2/54* (2013.01); *A23L 2/56* (2013.01); *A23L 2/72* (2013.01); *A23L 2/76* (2013.01); *A47J 31/4403* (2013.01); *A47J 31/525* (2018.08); *B67D 1/04* (2013.01); *A23V 2200/15* (2013.01); *B67D 2001/0481* (2013.01)

(58) Field of Classification Search
None
See application file for complete search history.

(56) References Cited

U.S. PATENT DOCUMENTS

| | | |
|---|---|---|
| 686,689 A | 11/1901 | Eschwege |
| 1,345,947 A | 7/1920 | Muller |
| 2,047,134 A | 7/1936 | Coleman |
| 2,263,610 A | 11/1941 | Cain |
| 2,599,682 A | 6/1952 | Wirtel et al. |
| 2,718,844 A | 9/1955 | Schwinger |
| 2,770,181 A | 11/1956 | Kahan |
| 2,878,746 A | 3/1959 | Schwinger |
| 3,199,437 A | 8/1965 | Nelson |
| 3,854,389 A | 12/1974 | Hillemann |
| 4,112,830 A | 9/1978 | Saito |
| 5,637,343 A | 6/1997 | Ikushima et al. |
| 6,981,441 B1 | 1/2006 | Dussinger |
| 7,104,531 B2 | 9/2006 | Page et al. |

(Continued)

FOREIGN PATENT DOCUMENTS

DE          230256 C      1/1910

OTHER PUBLICATIONS

Angell: WO 2016/164796; Cold Brew System, Method and Apparatus; published Oct. 133, 2016. (Year: 2016).*

*Primary Examiner* — Patricia A George
(74) *Attorney, Agent, or Firm* — Dawsey Co., LPA; David J. Dawsey

(57) ABSTRACT

A method of making a nitrogenized cold brew beverage at a low temperature and using a process that avoids the negative attributes associated with traditional cold brewing steeping methods.

20 Claims, 15 Drawing Sheets

(56) References Cited

U.S. PATENT DOCUMENTS

| | | |
|---|---|---|
| 8,383,181 B2 | 2/2013 | Daburger et al. |
| 8,720,321 B2 | 5/2014 | Neace, Jr. et al. |
| 9,386,782 B2 | 7/2016 | Choi et al. |
| 9,497,978 B2 | 11/2016 | Choi et al. |
| 9,623,383 B1 | 4/2017 | Kleinrichert |
| 9,629,493 B2 | 4/2017 | Belanich et al. |
| 9,801,405 B2 | 10/2017 | Kleinrichert |
| 9,955,710 B2 | 5/2018 | Hyde et al. |
| 9,961,917 B2 | 5/2018 | van Schyndel et al. |
| 9,999,314 B1 | 6/2018 | Neace et al. |
| 2015/0329343 A1 | 11/2015 | Kleinrchert |
| 2016/0270587 A1 | 9/2016 | Yu et al. |
| 2016/0280528 A1 | 9/2016 | Kleinrichert |
| 2017/0290354 A1 | 10/2017 | Pabst et al. |
| 2018/0007926 A1 | 1/2018 | Arroyo et al. |
| 2018/0098658 A1 | 4/2018 | Angell et al. |
| 2018/0221833 A1 | 8/2018 | Hyde et al. |

\* cited by examiner

COLD BREWING SYSTEM AND METHOD

CROSS-REFERENCE TO RELATED APPLICATIONS

This application claims the benefit of U.S. provisional patent application Ser. No. 62/572,009, filed on Oct. 13, 2017, all of which are incorporated by reference as if completely written herein.

STATEMENT REGARDING FEDERALLY SPONSORED RESEARCH OR DEVELOPMENT

Not applicable.

TECHNICAL FIELD

The present disclosure relates generally to the field cold brewed beverages.

BACKGROUND OF THE INVENTION

Conventional cold brewing systems and methods have been an afterthought and consumers have recognized that the taste has been inferior to traditionally brewed products. Often cold brew products, even those of major coffee chains, has consisted of little more than soaking coffee or tea in a bucket of water overnight, and serving it as a fresh cold brew product the next day. Such traditional steeping of coffee is detrimental to the taste of the final product.

SUMMARY OF THE INVENTION

Numerous variations, modifications, alternatives, and alterations of the various preferred embodiments, processes, and methods may be used alone or in combination with one another as will become more readily apparent to those with skill in the art, with reference to the following detailed description of the preferred embodiments and the accompanying figures and drawings. In its most general configuration, the present invention advances the state of the art with a variety of new methods, systems, and capabilities, and overcomes many of the shortcomings of prior devices and methods in new and novel ways, including the identification of new relationships that result in superior end products. In its most general sense, the present invention overcomes the shortcomings and limitations of the prior art in any of a number of generally effective configurations.

BRIEF DESCRIPTION OF THE DRAWINGS

Without limiting the scope of the present invention as claimed below and referring now to the drawings and figures:

Figure 1:
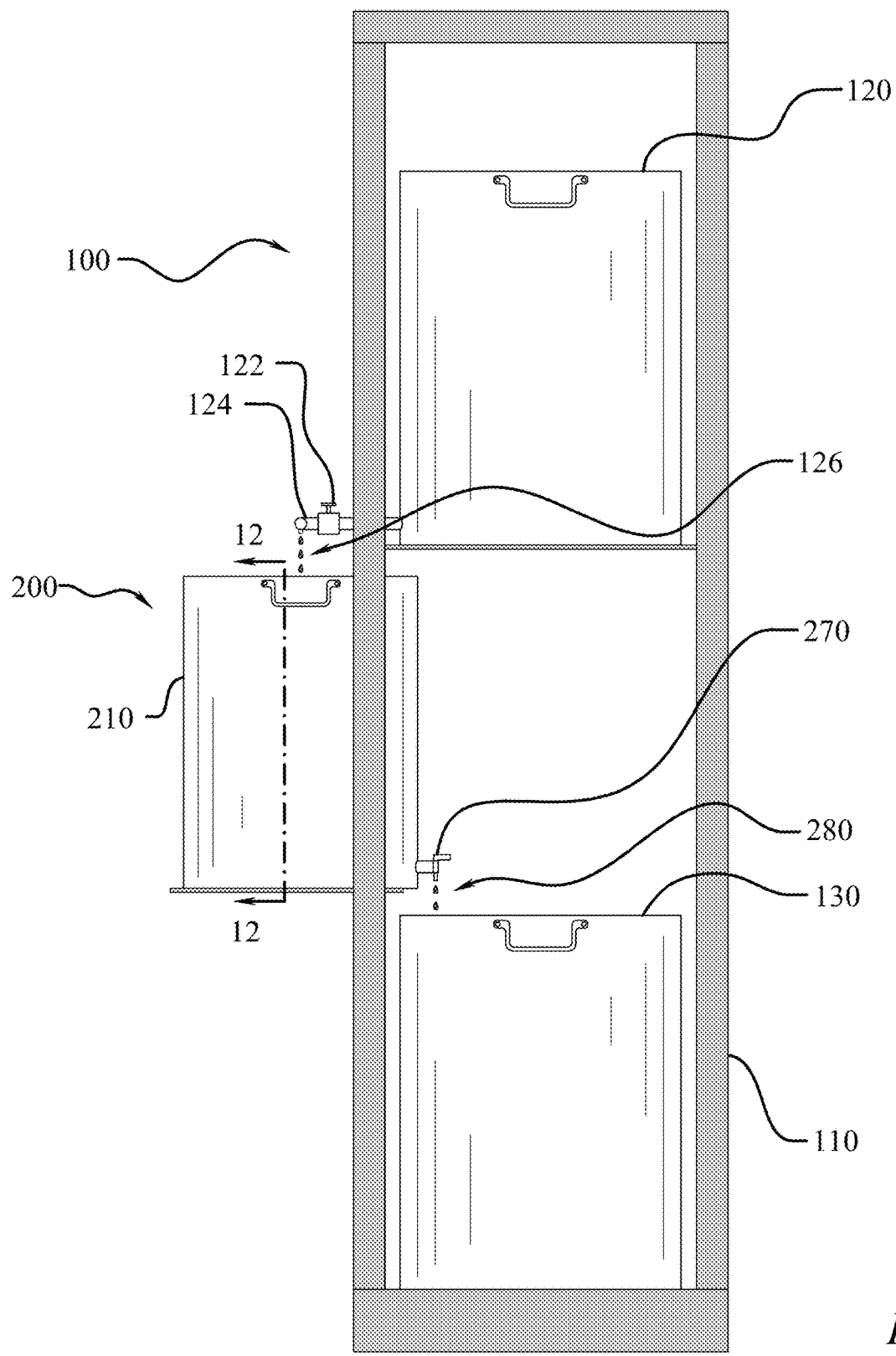
FIG. 1 is a front elevation view of an embodiment of a cold brewing system.

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The inventive features include all novel and non-obvious features disclosed herein both alone and in novel and non-obvious combinations with other elements. As used herein, the phrase "and/or" means "and", "or" and both "and" and "or". As used herein, the singular forms "a," "an," and "the" refer to one or more than one, unless the context clearly dictates otherwise. As used herein, the term "includes" means "comprises." The preferred embodiments of the invention accomplish the stated objectives by new and novel arrangements of elements and configurations, materials, and methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, materials, functions, means, and methods of implementing the invention in connection with the illustrated embodiments. It is to be understood, however, that the same or equivalent functions, features, and material properties may be accomplished by different embodiments that are also intended to be encompassed within the spirit and scope of the invention. The present disclosure is described with reference to the accompanying drawings with preferred embodiments illustrated and described. The disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout the disclosure and the drawings. In the figures, the thickness of certain lines, layers, components, elements or features may be exaggerated for clarity. The following disclosure describes embodiments of a cold brew beverage and dispensing system, which in some embodiments includes a heated tap. In one embodiment, a cold brewing system (100) has a cold brewing tower (110) that provides positioning and support to a water vat (120), as seen in FIG. 1. Additionally the cold brewing tower (110) may also provide positioning and support to beverage percolation system (200) and a beverage vat (130), wherein a resulting beverage (280) is temporarily stored. The illustrated embodiment is a gravity feed system that may be housed entirely, or partially, within a refrigerator.

Figure 23:
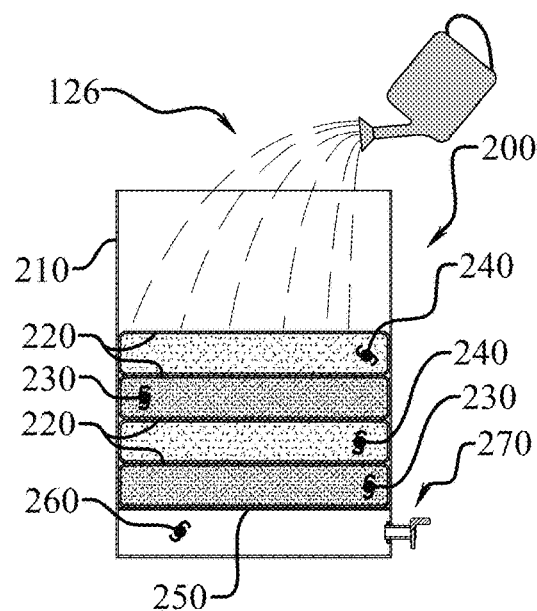
FIG. 23 is a cross-sectional view of an embodiment of an oversized golf club head taken along section line 10-10 in FIG. 1.
Figure 24:
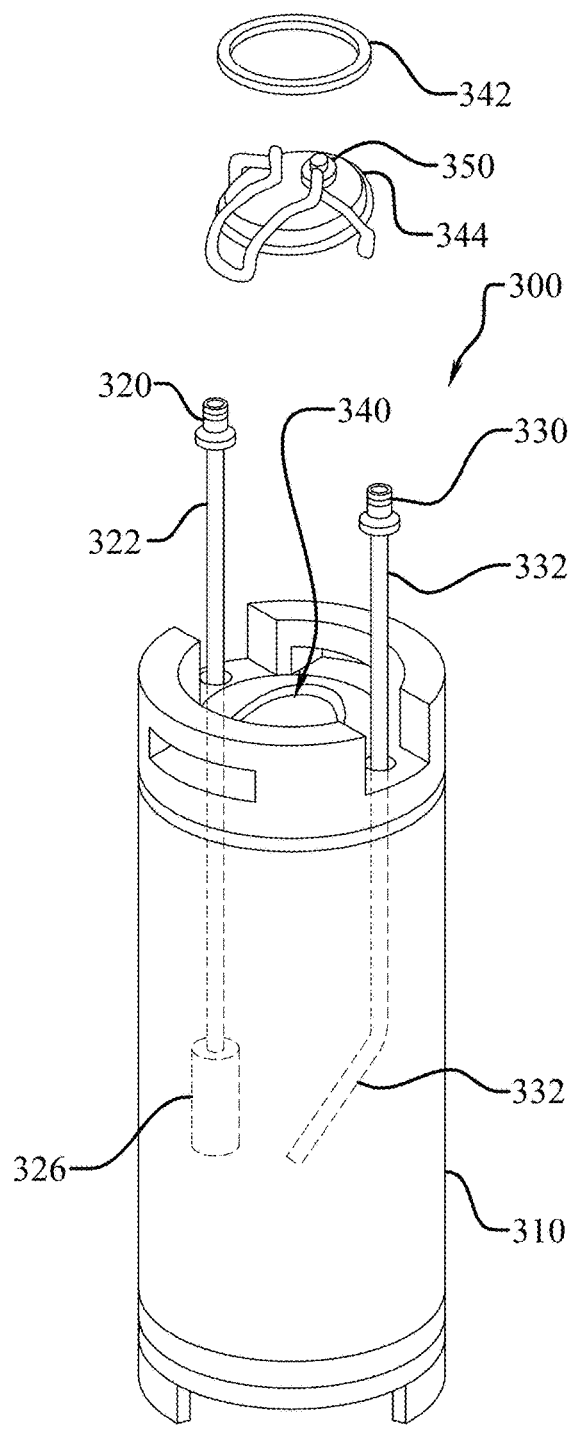
FIG. 24 is an exploded isometric view of a cold brew beverage storage system.

In one embodiment the water vat (120) may have a water control valve (122) that regulates the flow of water (126) being discharged from the water vat (120) into the beverage percolation system (200). Water (126) being delivered into the beverage percolation system (200) should be carefully metered to achieve the best tasting beverage (280). Too much water and beverage (280) can taste watered down or bitter. The water control valve (122) may be a manually set flow control valve wherein a user sets the flow rate, or an automatic electronically controlled water control valve (122). Furthermore, the water vat (120) may also have a water control valve outlet (124) that spreads out and distributes the water (126) flowing out of the water vat (120) into the beverage percolation system (200). In another embodiment of the cold brewing system (100), a water supply line maybe used instead of a water vat (120), not illustrated, wherein the water supply line connects to a water control valve (122) to control the flow of water (126) leading to the water control valve outlet (124). In yet another embodiment of the cold brewing system (100), the beverage vat (130) may be replaced with a cold brewed beverage storage system (300), as seen in FIGS. 23 and 24, which may save the step of transferring the beverage (280) from the beverage vat (130) into the cold brewed beverage storage system (300) at a later time. In still yet another embodiment of the cold brewing system (100) that utilizes an automatic electronically controlled water control valve (122), the cold brewing system (100) may use a beverage vat (130) or cold brewed beverage storage system (300) having a beverage level sensor, not shown in drawings, to monitor the level of beverage (280) therein. Once the beverage (280) approaches the maximum allowed capacity, the automatic electronically controlled water control valve (122) may slow or stop the flow of water (126) into the beverage percolation system (200) to prevent overfilling the beverage vat (130) or cold brewed beverage storage system (300). In yet another embodiment, the beverage vat (130) or cold brewed beverage storage system (300) may have an opacity sensor which measures the strength of the beverage (280) inside the beverage vat (130) or cold brewed beverage storage system (300). Initially, the strength of the beverage (280) coming out of the beverage percolation system (200) will be concentrated, but later the concentration will drop resulting in a less opaque beverage (280). Once the sensor reaches a minimum opacity level, it may send a signal to close the water control valve (122), thereby halting the cold brewing process.

Figure 2:
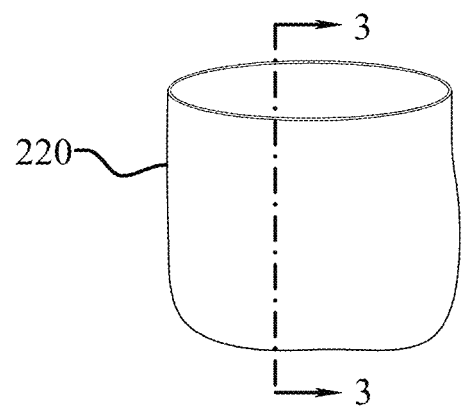
FIG. 2 is a front elevation view of an embodiment of a flavoring agent retainer.
Figure 12:
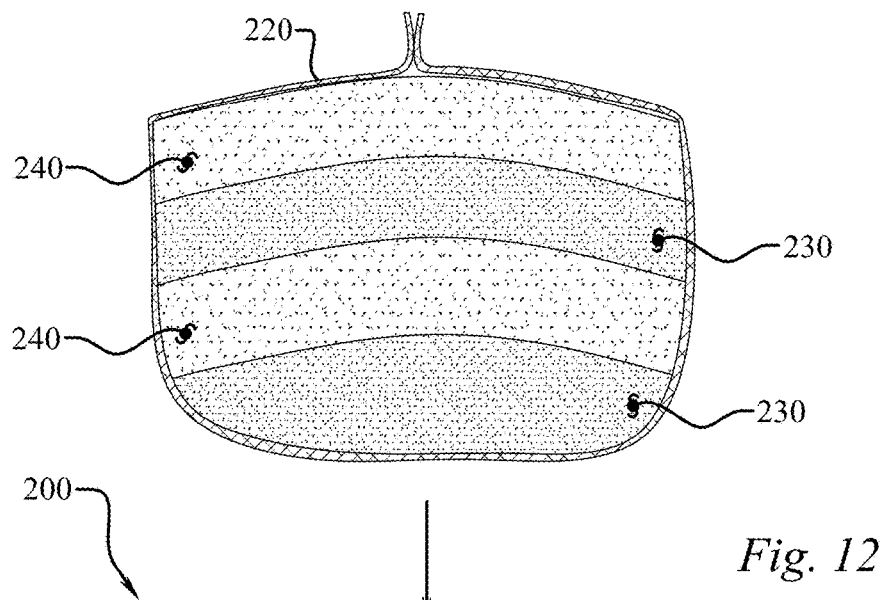
FIG. 12 is a cross-sectional view of an embodiment of a beverage percolation system taken along section line 12-12 in FIG. 1.
Figure 12:
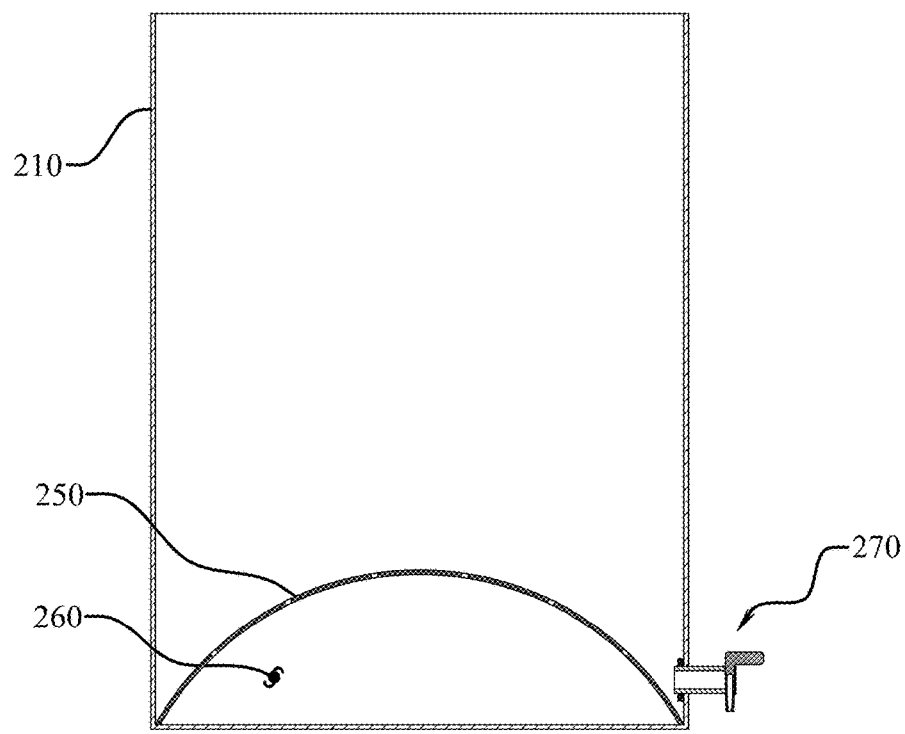

Now referring to FIG. 12, the beverage percolation system (200) may include a beverage percolation system container (210), a flavoring agent retainer (220), a first flavoring agent (230), a beverage percolation system sieve (250), a beverage percolation system reservoir (260), and a percolation system discharge control system (270). Another embodiment of beverage percolation system (200) may have, in addition to a first flavoring agent (230), a second flavoring agent (240). The flavoring agent retainer (220), as seen in FIG. 2, functions like a tea bag and retains the first flavoring agent (230), second flavoring agent (240) if used, and any additional flavoring agents that may be used. Furthermore, the flavoring agent retainer (220) freely allows water (126) to pass through while retaining the flavoring agents (230, 240) within. The flavoring agent retainer (220) may be composed of, but not limited to, a spunmelt nonwoven material, a woven fabric, or a metallic mesh or sieve. Additionally the composition of the first flavoring agent (230), second flavoring agent (240) and any additional flavoring agents depends on the beverage (280) being cold brewed. For instance, if the beverage (280) being cold brewed is coffee, the first flavoring agent (230) may be regular ground coffee beans; while the second flavoring agent (240) may be decaffeinated ground coffee beans, a different variation of ground coffee bean, or combination thereof. In like fashion, if a herbal tea is being cold brewed, the first flavoring agent (230), second flavoring agent (240) and any additional flavoring agents may include various teas and herbs.

Figure 3:
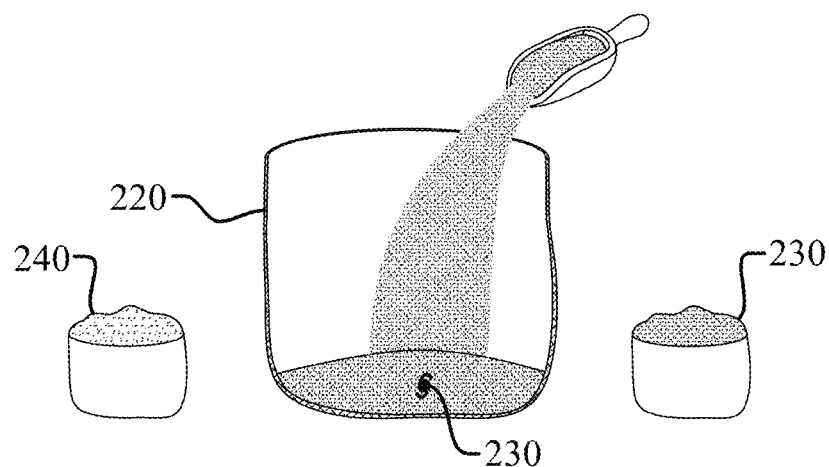
FIG. 3 is a cross-sectional view of an embodiment of a flavoring agent retainer taken along section line 3-3 in FIG. 2.
Figure 4:
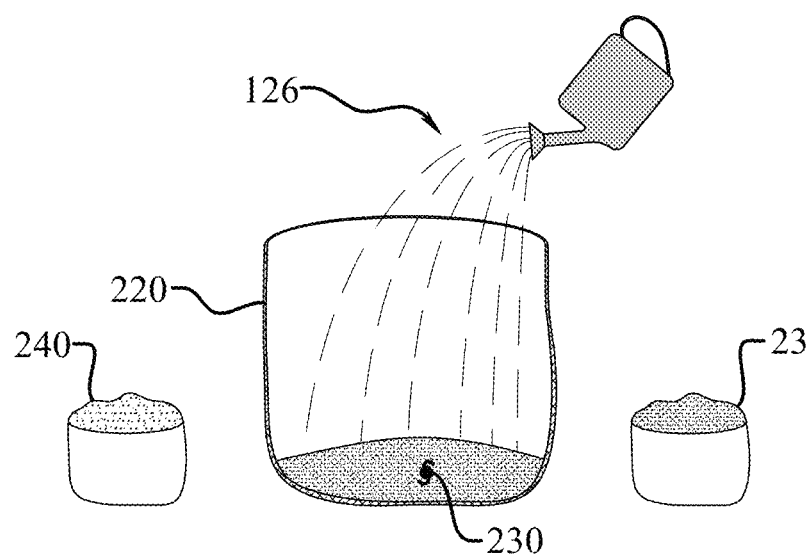
FIG. 4 is a cross-sectional view of an embodiment of a flavoring agent retainer taken along section line 3-3 in FIG. 2.
Figure 5:
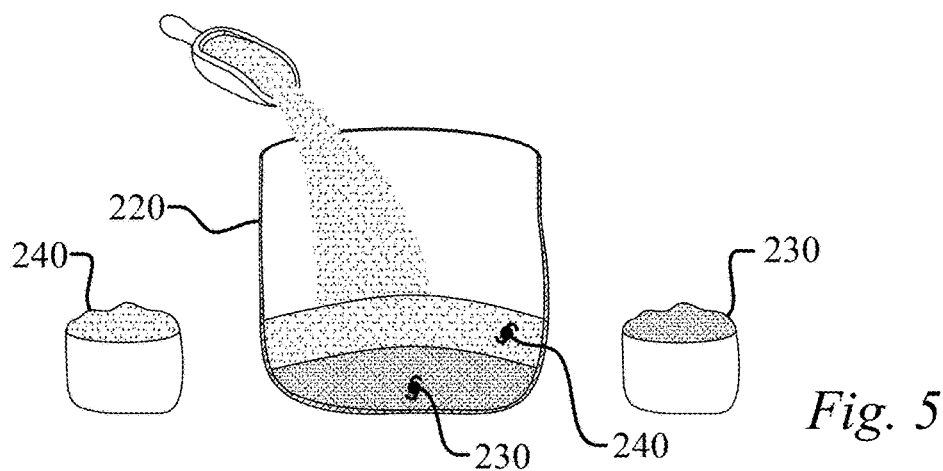
FIG. 5 is a cross-sectional view of an embodiment of a flavoring agent retainer taken along section line 3-3 in FIG. 2.
Figure 6:
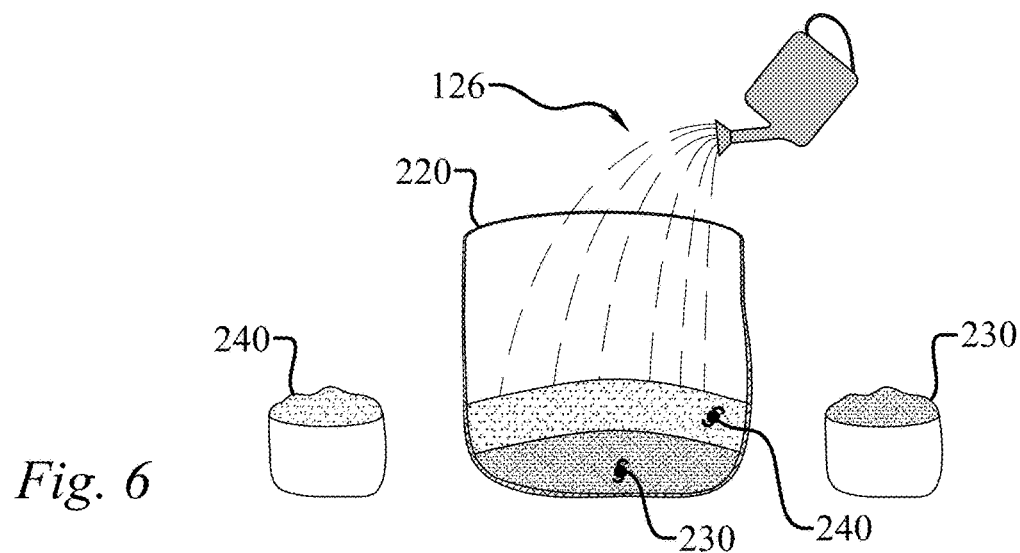
FIG. 6 is a cross-sectional view of an embodiment of a flavoring agent retainer taken along section line 3-3 in FIG. 2.
Figure 7:
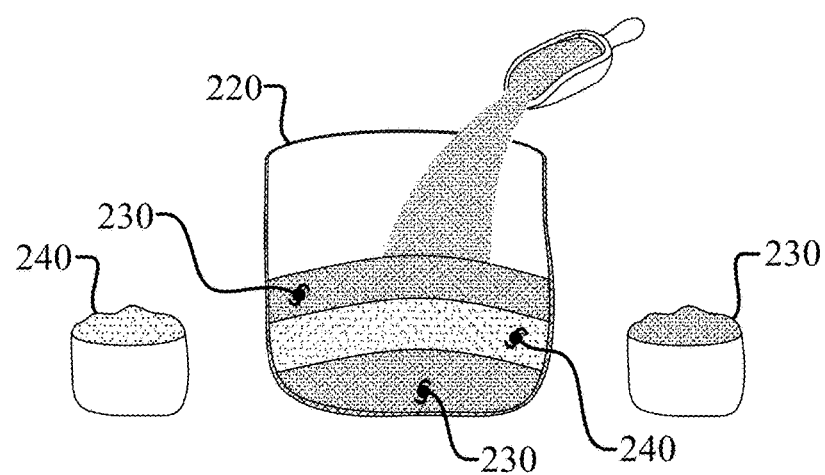
FIG. 7 is a cross-sectional view of an embodiment of a flavoring agent retainer taken along section line 3-3 in FIG. 2.
Figure 8:
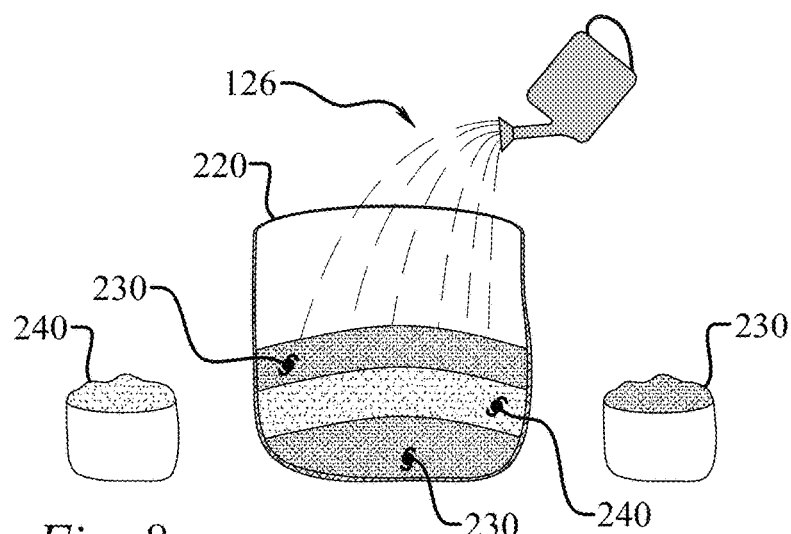
FIG. 8 is a cross-sectional view of an embodiment of a flavoring agent retainer taken along section line 3-3 in FIG. 2.
Figure 9:
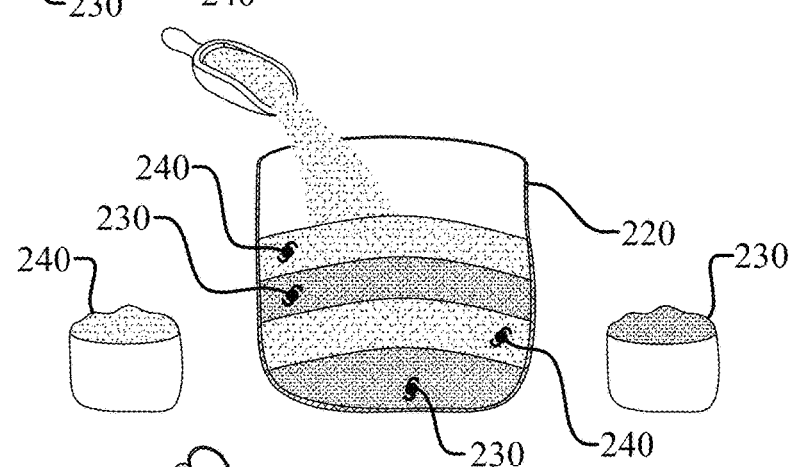
FIG. 9 is a cross-sectional view of an embodiment of a flavoring agent retainer taken along section line 3-3 in FIG. 2.
Figure 10:
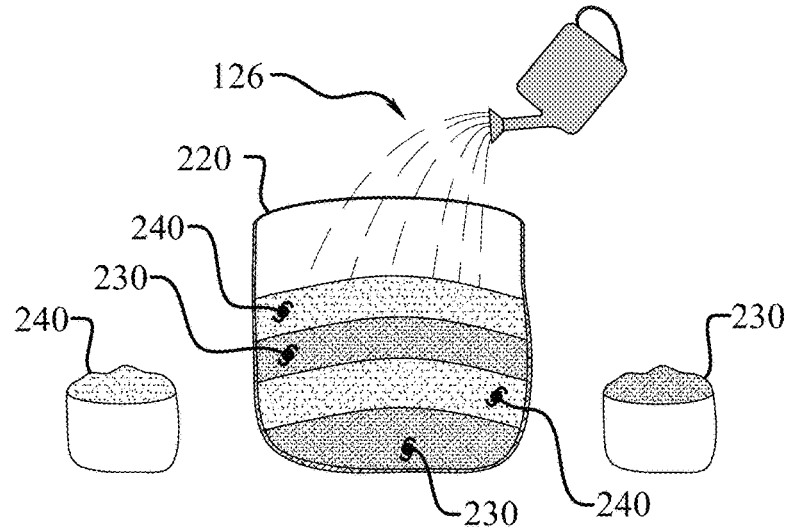
FIG. 10 is a cross-sectional view of an embodiment of a flavoring agent retainer taken along section line 3-3 in FIG. 2.
Figure 11:
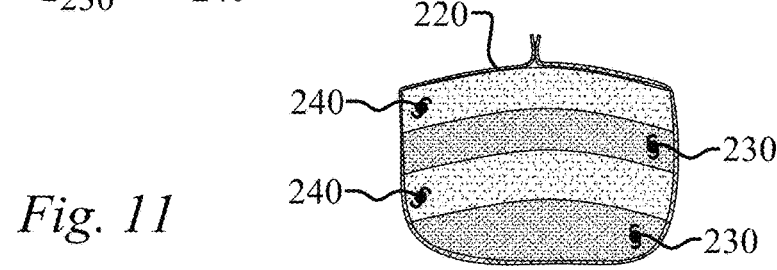
FIG. 11 is a cross-sectional view of an embodiment of a flavoring agent retainer taken along section line 3-3 in FIG. 2.

In one embodiment, preparing the beverage percolation system (200) starts with putting a layer of the first flavoring agent (230) into the flavoring agent retainer (220) as seen in FIG. 3. Next, in order to facilitate proper flow through the flavoring agent, and the associated compound extraction, water (126) may be applied to the first flavoring agent (230) inside of the flavoring agent retainer (220), or as it is loaded into the flavoring agent retainer (220), as seen in FIG. 4. Next, a layer of the second flavoring agent (240) may be placed on top of the first flavoring agent (230) located inside flavoring agent retainer (220), as illustrated in FIG. 5. As seen in FIG. 6, water (126) may be applied to the second flavoring agent (240) inside of the flavoring agent retainer (220), or as it is loaded into the flavoring agent retainer (220), to facilitate proper flow through the flavoring agent, and the associated compound extraction. After which, another layer of the first flavoring agent (230) may be deposited on the layer of second flavoring agent (240) inside of the flavoring agent retainer (220), illustrated in FIG. 7. Again, water (126) may be applied to the second layer of first flavoring agent (230) located in the flavoring agent retainer (220), as seen in FIG. 8. Now a second layer of the second flavoring agent (240) may be deposited on the second layer of first flavoring agent (230) inside of the flavoring agent retainer (220), as seen in FIG. 9. Now water (126) may be applied to the a second layer of the second flavoring agent (240) inside of the flavoring agent retainer (220), as shown in FIG. 10. The process is repeated until the desired number of layers of flavoring agents (230, 240) have been achieved. Lastly, as seen in FIG. 11, the sides of the flavoring agent retainer (220) are gathered together and fixed in a closed state. In an alternative embodiment wherein the flavoring agent retainer (220) is composed of a metallic mesh or sieve, a permeable releasably fixable lid may be used to close the flavoring agent retainer (220), not illustrated in the drawings. Thus, one embodiment incorporates at least two different flavoring agents, arranged in at least two layers, not mixed, and in approximately equal weight proportions; while a further embodiment incorporates at least two different flavoring agents, arranged in at least four alternating layers, not mixed, and in approximately equal weight proportions. Preferential flow patterns and contact time have been observed in embodiments having a layer thickness, which is the vertical thickness of each individual layer, of 1-4" per 12" of the greatest percolation system width (202), narrowed in a further embodiment to 1.5-3.5" per 12" of the greatest percolation system width (202).

Figure 19:
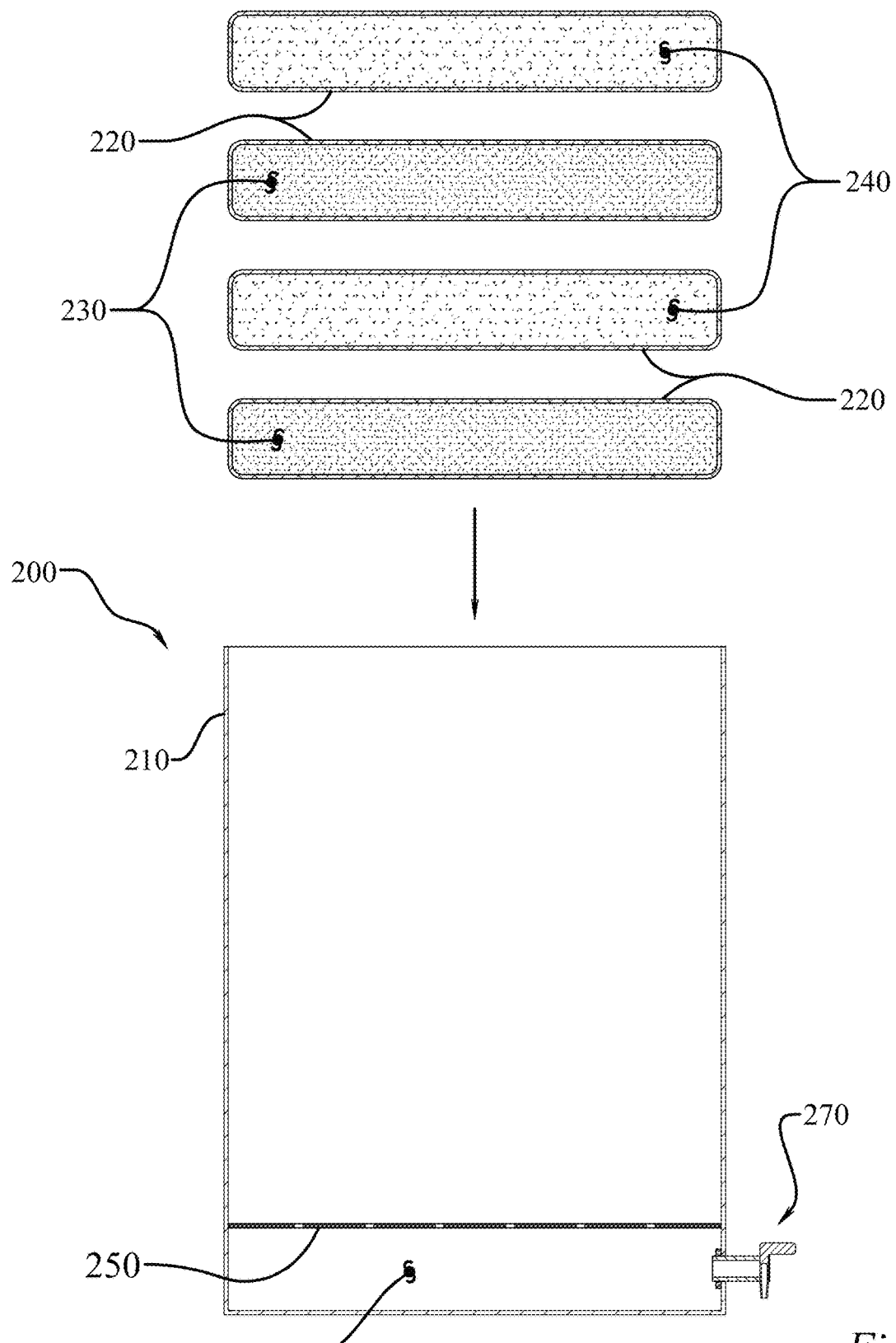
FIG. 19 is a cross-sectional view of an embodiment of a beverage percolation system taken along section line 12-12 in FIG. 1.
Figure 20:
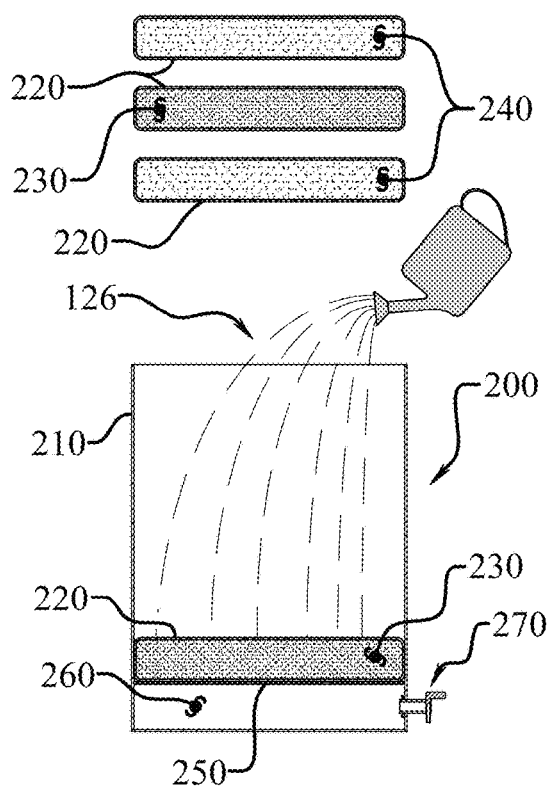
FIG. 20 is a cross-sectional view of an embodiment of a beverage percolation system taken along section line 12-12 in FIG. 1.
Figure 21:
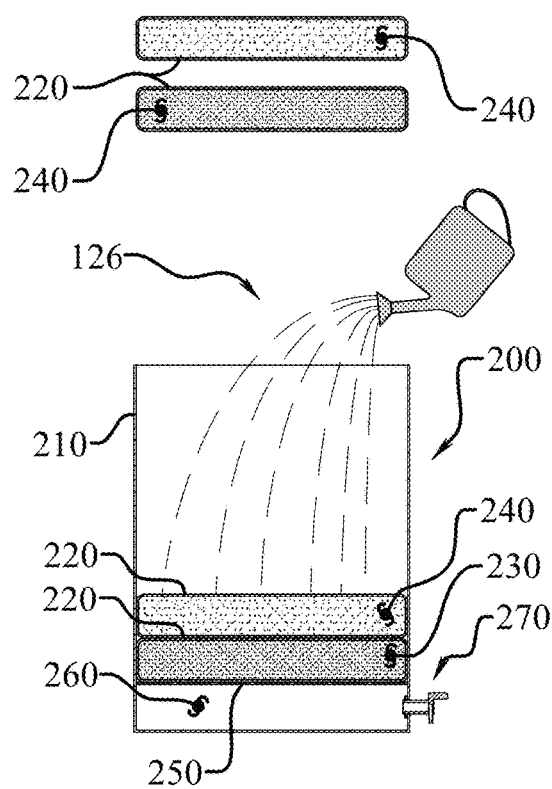
FIG. 21 is a cross-sectional view of an embodiment of a beverage percolation system taken along section line 12-12 in FIG. 1.
Figure 22:
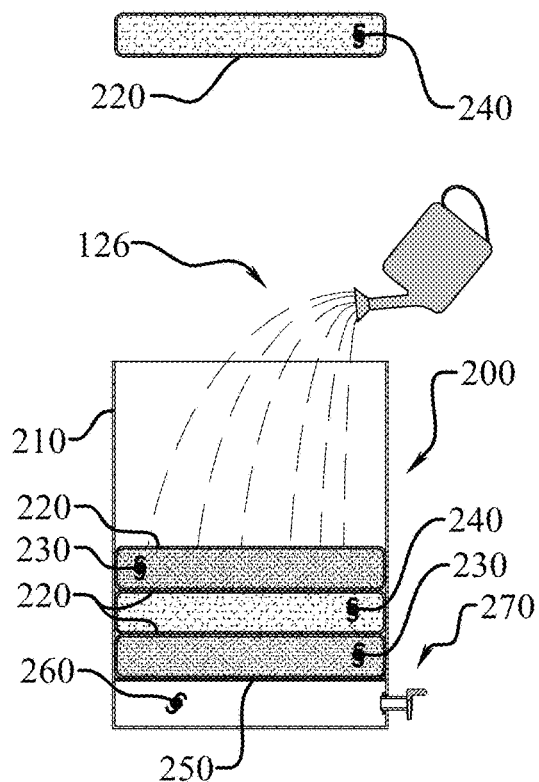
FIG. 22 is a cross-sectional view of an embodiment of a beverage percolation system taken along section line 12-12 in FIG. 1.

In another embodiment of preparing the beverage percolation system (200) comprises the use of a single flavoring agent. One skilled in the art will recognize, and for the ease of illustration, in this embodiment the first flavoring agent (230) and second flavoring agent (240) are identical in the accompanying figures, any may contain the same layering embodiments discussed elsewhere herein. The user In yet another embodiment of preparing the beverage percolation system (200), premade flavoring agents (230, 240) are individually and modularly contained in flavoring agent retainers (220), as seen in FIGS. 19-22. Loading the beverage percolation system (200) starts with putting a first flavoring agent (230) module into the flavoring agent retainer (220). Next, water (126) may be applied to the first flavoring agent (230) module, as seen in FIG. 19. Next, a second flavoring agent (240) module may be placed on top of the first flavoring agent (230) module. After which water (126) may be applied to the second flavoring agent (240) module, as illustrated in FIG. 20. Next, another module of the first flavoring agent (230) may be placed on the second flavoring agent (240) module. Like before, water (126) may be applied to the second first flavoring agent (230) module, as seen in FIG. 21. Now a second second flavoring agent (240) module may be placed on the second first flavoring agent (230) module. Now water (126) may be applied to the second second flavoring agent (240) module. The process is repeated until the desired number of modules of flavoring agents (230, 240) has been achieved.

Figure 18:
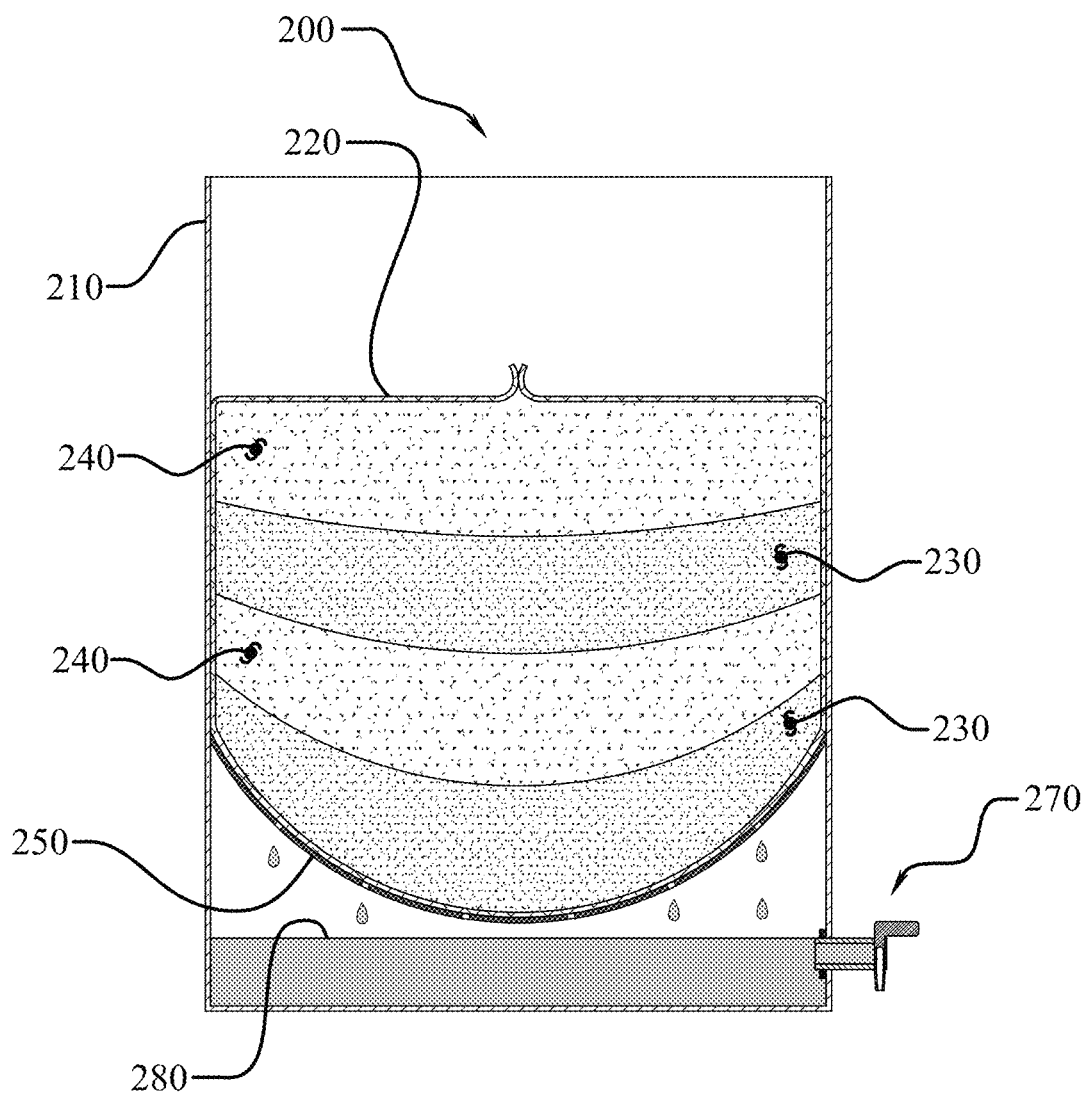
FIG. 18 is a cross-sectional view of an embodiment of a beverage percolation system taken along section line 12-12 in FIG. 1.

Now referring again to FIG. 11, after the flavoring agent retainer (220) has been filled with the layers of flavoring agents (230, 240) and the flavoring agent retainer (220) has been closed and sealed, it is inserted into the beverage percolation system container (210) and rest against the beverage percolation system sieve (250). Additionally, the beverage percolation system sieve (250) is porous, allowing liquids to freely pass there through. Furthermore, the beverage percolation system sieve (250) forms a percolated beverage reservoir (260) beneath the beverage percolation system sieve (250) and the bottom of the beverage percolation system container (210), as illustrated in FIGS. 12-22. In one embodiment, as seen in FIGS. 12-16, the side of the beverage percolation system sieve (250) adjacent to the flavoring agent retainer (220) and flavoring agents (230, 240) may be convex. In another embodiment, as seen in FIGS. 17, 19-22, the side of the beverage percolation system sieve (250) adjacent to the flavoring agent retainer (220) and flavoring agents (230, 240) may be flat. In still yet another embodiment as seen in FIG. 18, the side of the beverage percolation system sieve (250) adjacent to the flavoring agent retainer (220) may be concave.

In yet another embodiment of preparing the beverage percolation system (200), premade flavoring agents (230, 240) are individually and modularly contained in flavoring agent retainers (220), as seen in FIGS. 19-22. Loading the beverage percolation system (200) starts with putting a first flavoring agent (230) module into the flavoring agent retainer (220). Next, water (126) may be applied to the first flavoring agent (230) module, as seen in FIG. 19. Next, a second flavoring agent (240) module may be placed on top of the first flavoring agent (230) module. After which water (126) may be applied to the second flavoring agent (240) module, as illustrated in FIG. 20. Next, another module of the first flavoring agent (230) may be placed on the second flavoring agent (240) module. Like before, water (126) may be applied to the second first flavoring agent (230) module, as seen in FIG. 21. Now a second flavoring agent (240) module may be placed on the second first flavoring agent (230) module. Now water (126) may be applied to the second second flavoring agent (240) module. The process is repeated until the desired number of modules of flavoring agents (230, 240) has been achieved.

Figure 13:
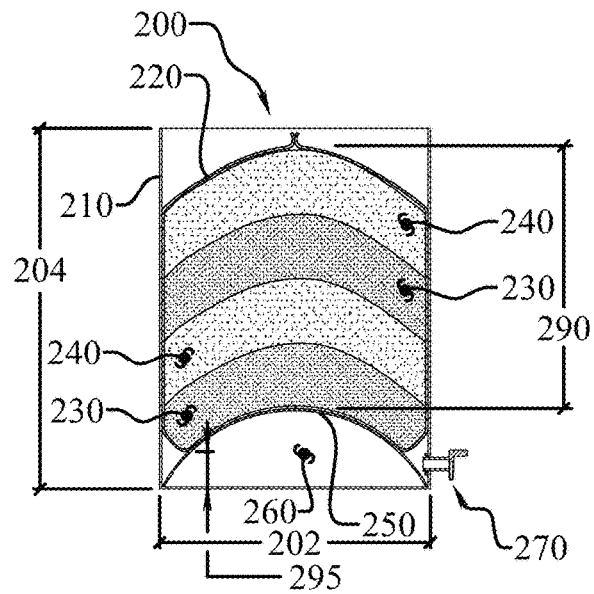
FIG. 13 is a cross-sectional view of an embodiment of a beverage percolation system taken along section line 12-12 in FIG. 1.
Figure 14:
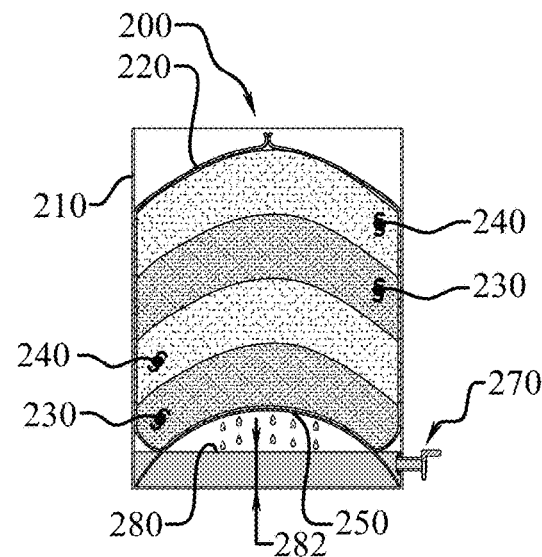
FIG. 14 is a cross-sectional view of an embodiment of a beverage percolation system taken along section line 12-12 in FIG. 1.
Figure 15:
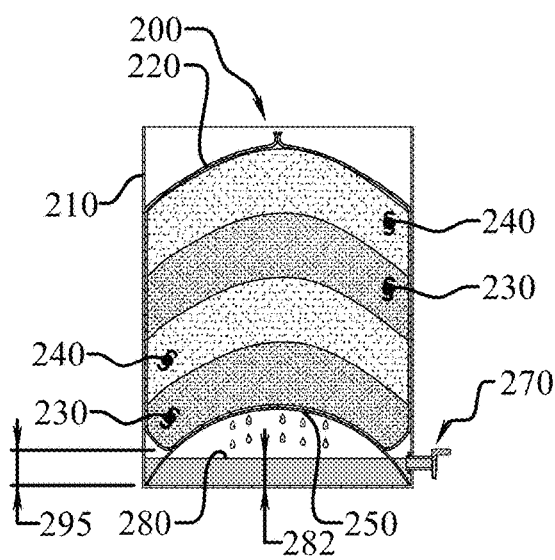
FIG. 15 is a cross-sectional view of an embodiment of a beverage percolation system taken along section line 12-12 in FIG. 1.
Figure 16:
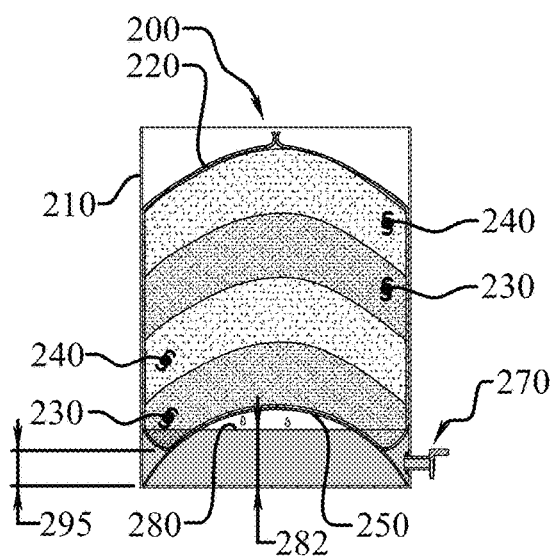
FIG. 16 is a cross-sectional view of an embodiment of a beverage percolation system taken along section line 12-12 in FIG. 1.
Figure 17:
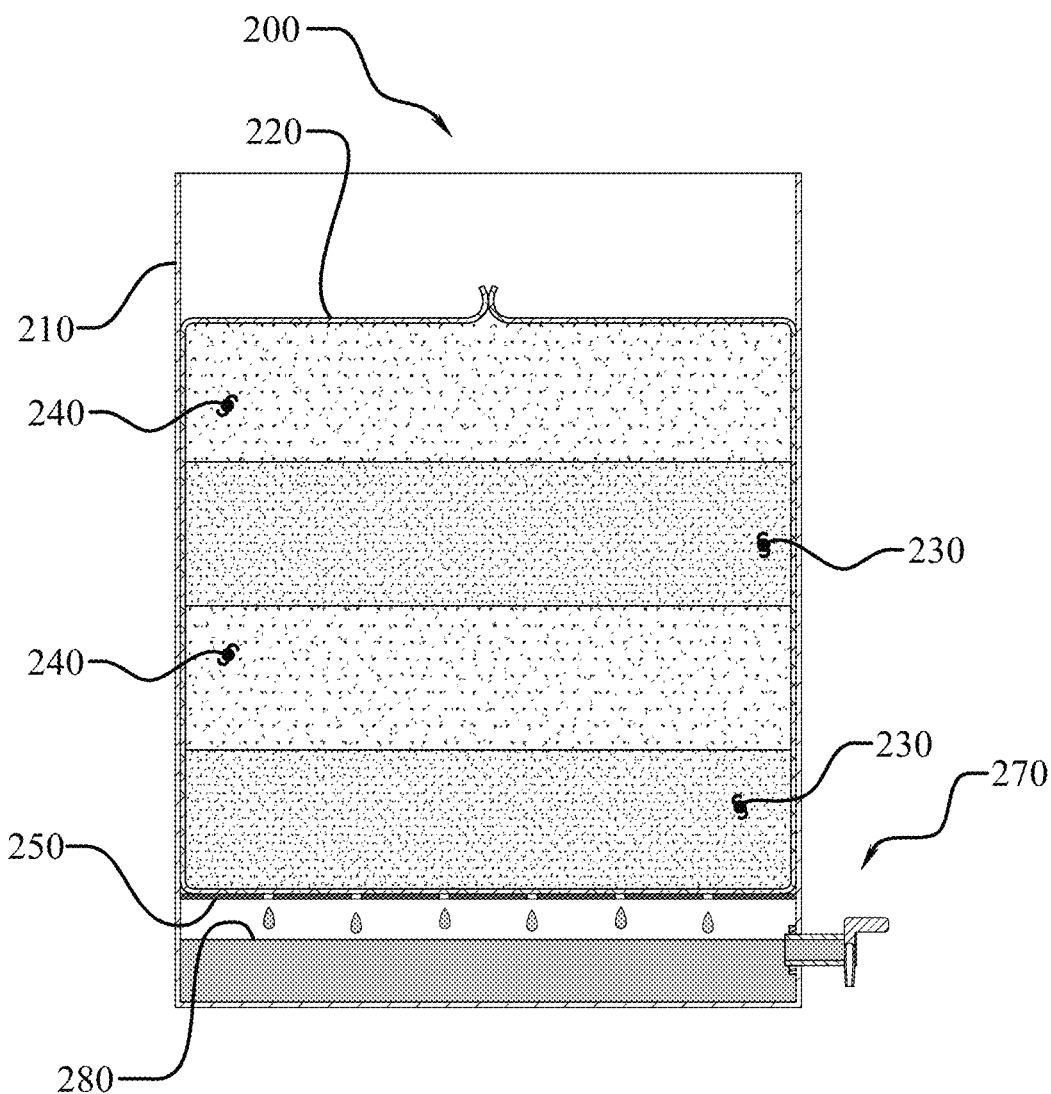
FIG. 17 is a cross-sectional view of an embodiment of a beverage percolation system taken along section line 12-12 in FIG. 1.

Now referring to FIGS. 1 and 14, water (126) drips out of the water control valve outlet into the upper portion of the flavoring agent retainer (220) and passes through the first flavoring agent (230) and second flavoring agent (240) layers, and after which it passes through the beverage percolation system sieve (250) into the percolated beverage reservoir (260). The percolated beverage reservoir (260) acts as a temporary storage area for the now cold brewed beverage (280) to pass into from the beverage percolation system sieve (250). The percolation system discharge control system (270), as seen in FIGS. 12-22, allows controlling the rate of flow of the beverage (280) from the beverage percolation system (200) to the beverage vat (130), or alternatively the cold brew beverage storage system (300). In one embodiment, the percolation system discharge control system (270) is set to allow a beverage (280) flow rate where the cold brewed beverage (280) touches the bottom of the flavoring agent retainer (220), as seen in FIG. 14. In another embodiment, the percolation system discharge control system (270) is set to allow a beverage (280) flow rate where the cold brewed beverage (280) stays below and never touches the flavoring agent retainer (220), as illustrated in FIG. 15. In still yet another embodiment, the percolation system discharge control system (270) is set to allow a beverage (280) flow rate where the cold brewed beverage (280) level is higher than the bottom of flavoring agent retainer (220), as seen in FIG. 16. Like the prior mentioned water control valve (124), the percolation system discharge control system (270), as well as any of the valves or taps disclosed herein, may be a manual valve that is set by the end user, or alternatively an automatic controlled valve that may be electronic, pneumatic, or self-modulating.

The cold brewing system (100) may utilize a cold brew beverage storage system (300) to help preserve, store and transport the beverage (280) after it has been brewed. As illustrated in FIG. 24, the cold brew beverage storage system (300) may include a cold brew beverage storage system tank (310), a nitrogen fill port (320), connected to a nitrogen fill tube (322) having a nitrogen fill dispensing stone (326) located on the opposite end of the nitrogen fill tube (322), a cold brew beverage outlet port (330), which may have a cold brew beverage output port tube (332), a cold brew beverage storage system fill opening (340), with a corresponding a cold brew beverage storage system fill opening gasket (342) and a cold brew beverage storage system fill opening closure (344), and a cold brew beverage storage system vent (350). The cold brew beverage storage system tank (310) may be used in place of the beverage vat (130) in the cold brewing tower (110) setup, or alternatively, as a storage tank filled from the beverage vat (130).

Figure 25:
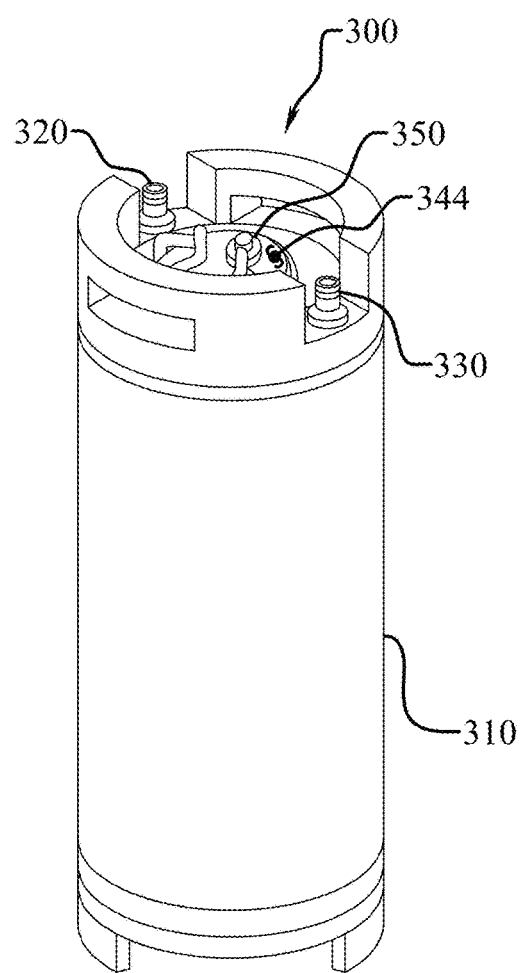
FIG. 25 is an isometric view of a cold brew beverage storage system.

The cold brew beverage storage system fill opening (340) allows a beverage (280) to be poured into the cold brew beverage storage system tank (310). Once the beverage (280) have been poured into the cold brew beverage storage system tank (310), the cold brew beverage storage system fill opening (340) is plugged with the cold brew beverage storage system fill opening closure (344) with the cold brew beverage storage system fill opening gasket (342) acting as a seal there between, as seen in FIGS. 24 and 25.

Figure 26:
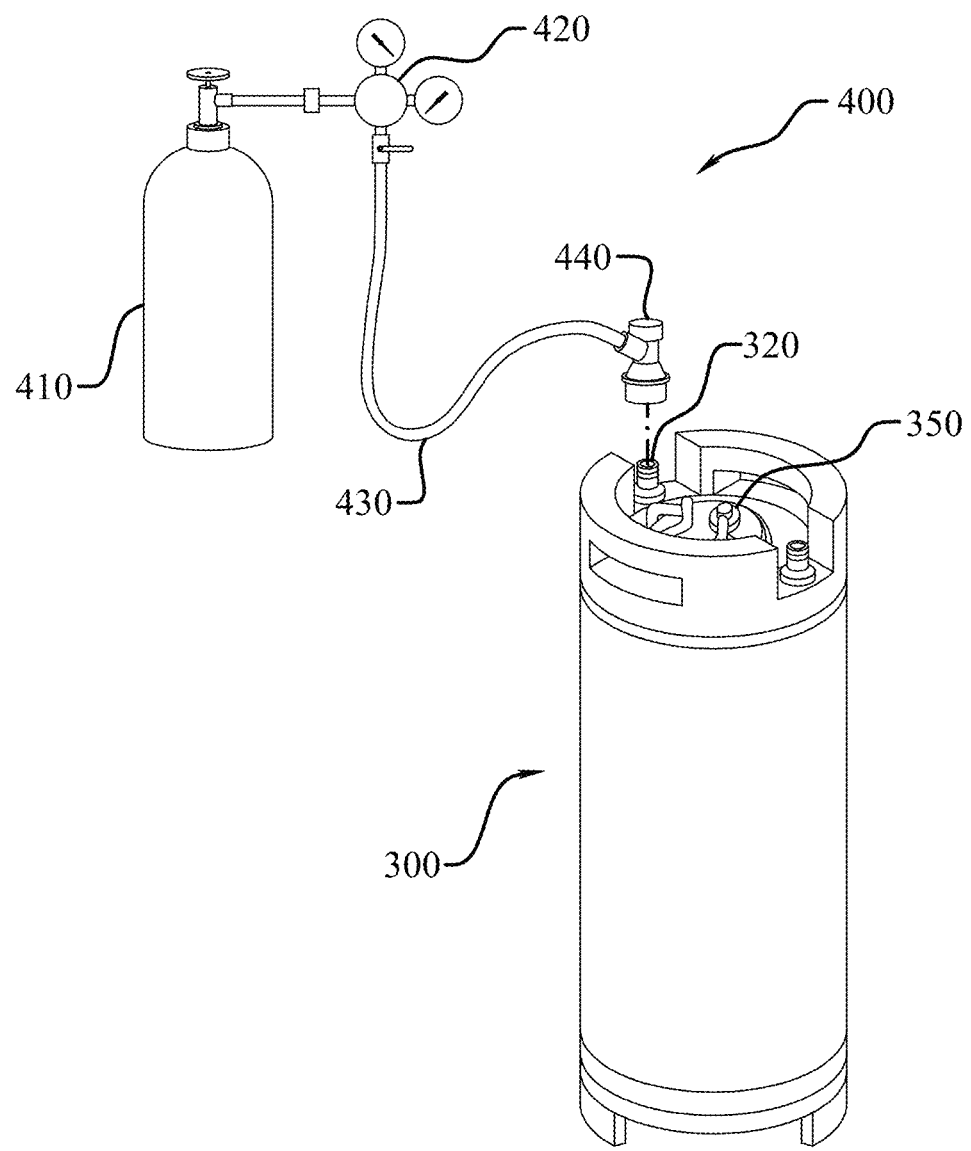
FIG. 26 is an isometric view of a cold brew beverage storage system and a cold brew beverage storage charging system.

The nitrogen fill port (320) allows the cold brew beverage storage system (300) to connect to a nitrogen source (410), seen in FIG. 26, to pressurize the cold brew beverage storage system (300) and to nitrogenize the beverage (280) inside of the cold brew beverage storage system tank (310). The nitrogen fill port (320) is connected to the nitrogen fill tube (322) that extends from the top of the cold brew beverage storage system tank (310) to the bottom, as seen in FIG. 24. The nitrogen fill dispensing stone (326) maybe attached to the bottom portion of the nitrogen fill tube (322). As nitrogen is passed through the nitrogen fill dispensing stone (326), fine nitrogen bubbles form on the outside surface of the nitrogen fill dispensing stone (326), which helps a portion of the nitrogen to dissolve into the beverage (280). The cold brew beverage storage system vent (350), as seen in FIGS. 23-25, allows expulsion of atmospheric air inside of the cold brew beverage storage system tank (310) when it is being charged with nitrogen.

Figure 27:
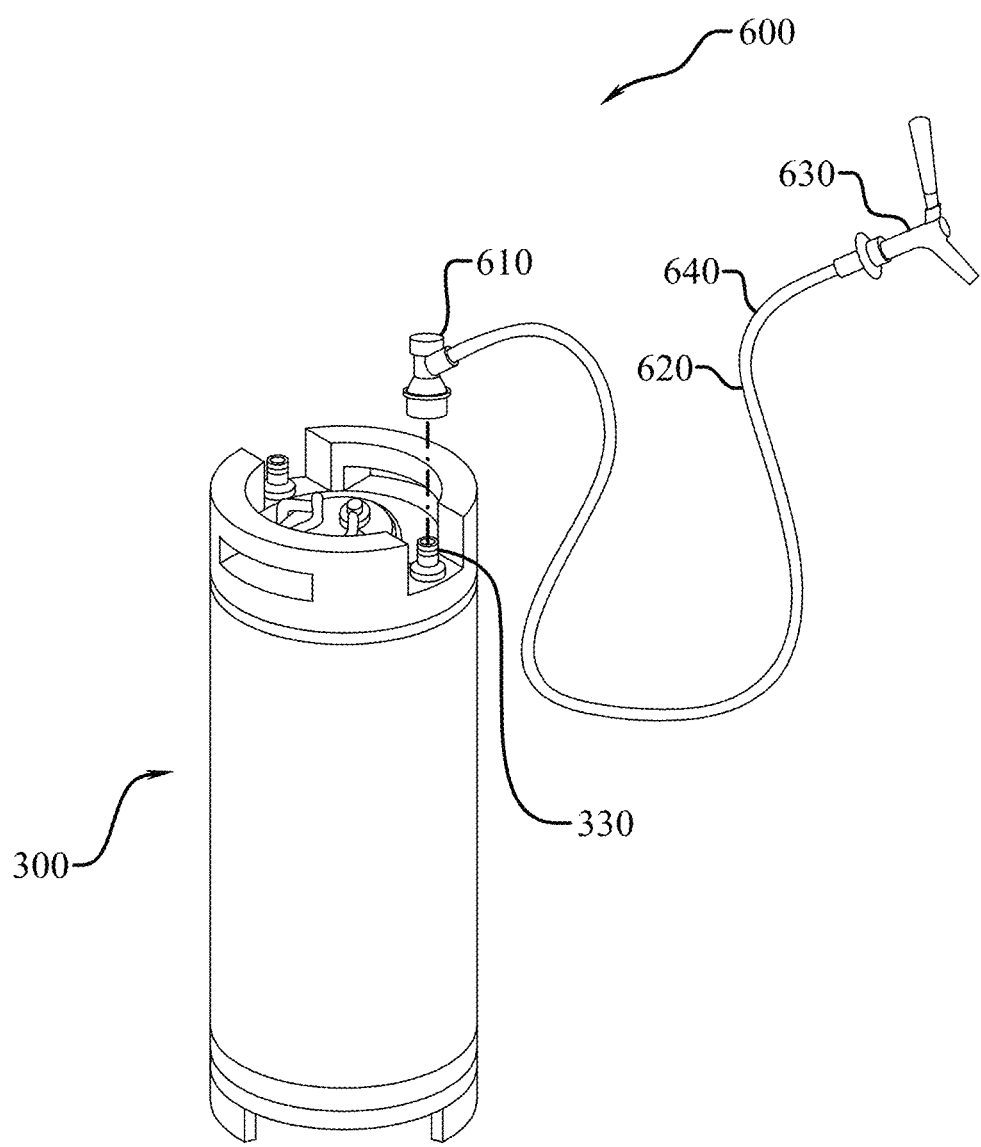
FIG. 27 is an isometric view of a cold brew beverage storage system and a cold brew beverage dispensing system.

The cold brew beverage outlet port (330) allows the cold brew beverage storage system (300) to connect to a cold brew beverage dispensing system (600), as seen in FIG. 27. The cold brew beverage outlet port (330) maybe connected to the cold brew beverage outlet port tube (332), seen in FIG. 24. Pressure inside of the cold brew beverage storage system tank (310) causes the beverage (280) to be driven up the cold brew beverage outlet port tube (332) and to the connected cold brew beverage dispensing system (600).

In FIG. 26, a cold brew beverage storage charging system (400) is illustrated. The cold brew beverage storage charging system (400) may include a nitrogen source (410); a nitrogen source regulator (420); a nitrogen source supply line (430); and a nitrogen source fill port attachment (440). In one embodiment, the nitrogen source (410) may be a pressurized canister of nitrogen. In another embodiment, the nitrogen source (410) may be a liquid nitrogen to gas convertor system. The nitrogen source regulator (420) is connected to the nitrogen source (410) and limits the amount of pressure of the nitrogen gas being delivered to the cold brew beverage storage system (300). Too much pressure may rupture the cold brew beverage storage system tank (310), and too little pressure will prevent adequate infusion of the nitrogen into the beverage (280) and sufficient pressure to drive the beverage (280) from the cold brew beverage storage system (300) to the cold brew beverage dispensing system (600). In a preferred embodiment nitrogen is infused into the beverage at a pressure of 15-60 psig, and at 25-50 psig in another embodiment, and 30-45 psig in still a further embodiment. The nitrogen source supply line (430) is connected to the regulated side of the nitrogen source regulator (420), as seen in FIG. 26, and is connected to the nitrogen fill port attachment (440). The nitrogen fill port attachment (440) releasably attaches to the nitrogen fill port (320) located on the cold brew beverage storage system (300). Furthermore, when the nitrogen fill port attachment (440) is attached to the nitrogen fill port (320), it opens a normally closed valve located inside of the nitrogen fill port (320), allowing nitrogen to flow into the cold brew beverage storage system tank (310). It is desirable to remove as much atmospheric gases from the cold brew beverage storage system tank (310) and have only pure nitrogen gas to prevent biological growth, and to prevent the oxidation of the beverage (280) stored in the cold brew beverage storage system (300). During the nitrogen charging process the cold brew beverage storage system vent (350) maybe opened several times to expel atmospheric gases from the cold brew beverage storage system tank (310). Next, upon removal of the nitrogen fill port attachment (440) from the nitrogen fill port (320), the valve located inside of the nitrogen fill port (320) closes, preventing the loss of nitrogen from the now pressurized cold brew beverage storage system (300).

Now referencing the cold brew beverage dispensing system (600) illustrated in FIG. 27. In one embodiment, the cold brew beverage dispensing system (600) may include a cold brew beverage output port connector (610); a beverage supply line (620); a dispensing tap (630); and a dispensing tap line (640). The cold brew beverage output port connector (610) releasably attaches to the cold brew beverage outlet port (330) located on the cold brew beverage storage system (300). Furthermore, when the cold brew beverage output port connector (610) is attached to the cold brew beverage outlet port (330), it opens a normally closed valve located inside of the cold brew beverage outlet port (330), thereby allowing the beverage (280) to flow out of the cold brew beverage storage system (300). Additionally, when the cold brew beverage output port connector (610) is removed from the cold brew beverage outlet port (330), the valve located inside of the cold brew beverage outlet port (330) closes, thereby preventing the beverage (280) and nitrogen from flowing out of the cold brew beverage storage system (300). The beverage supply line (610), which may also be the dispensing tap line (640), may be permanently attached to the cold brew beverage output port connector. In one embodiment, of the cold brew beverage dispensing system (600), the opposite end of the beverage supply line (610), which is the dispensing tap line (640), is attached to the dispensing tap (630).

Figure 28:
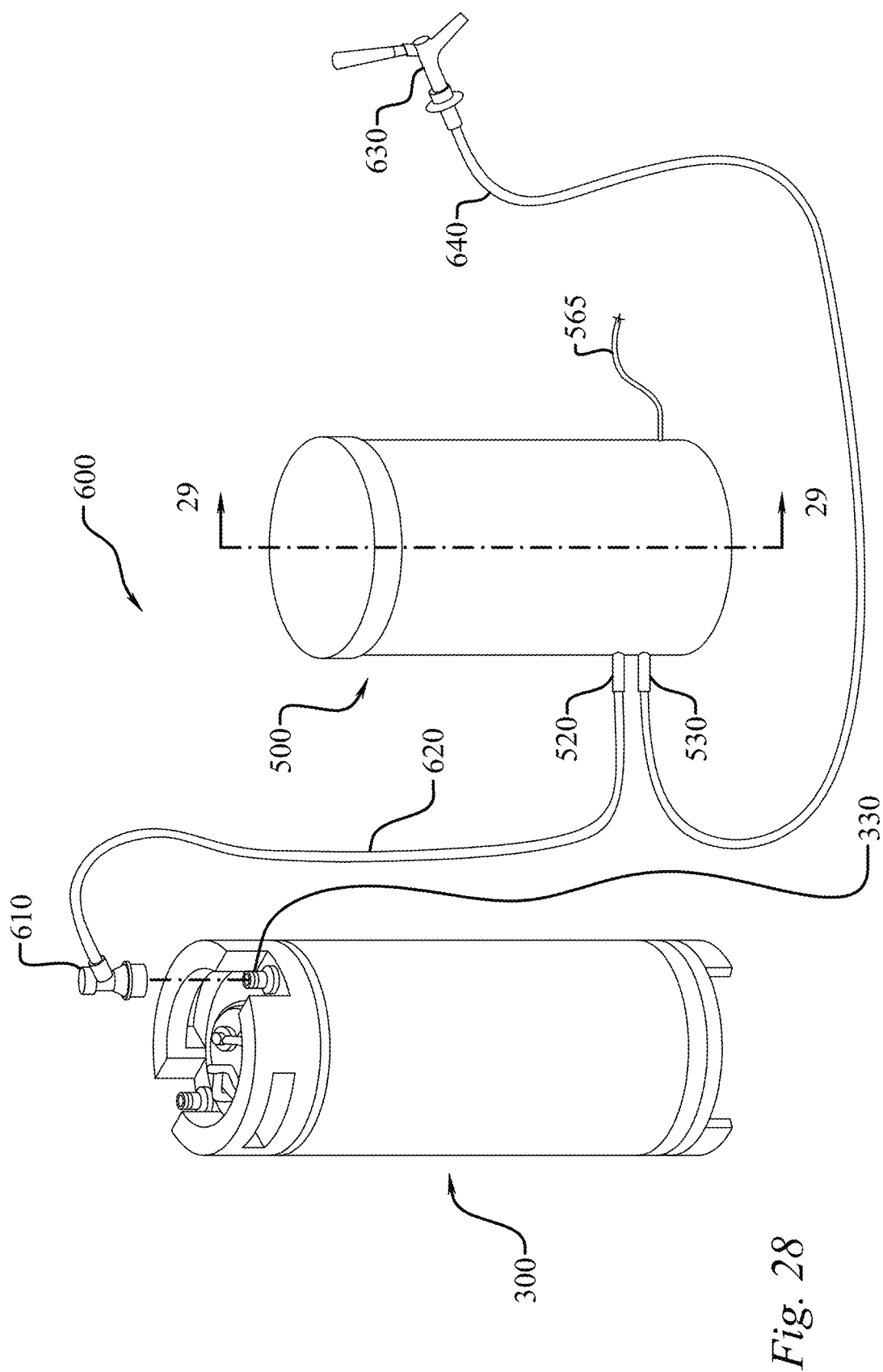
FIG. 28 is an isometric view of a cold brew beverage storage system, a cold brew beverage heating system, and a cold brew beverage dispensing system.
Figure 29:
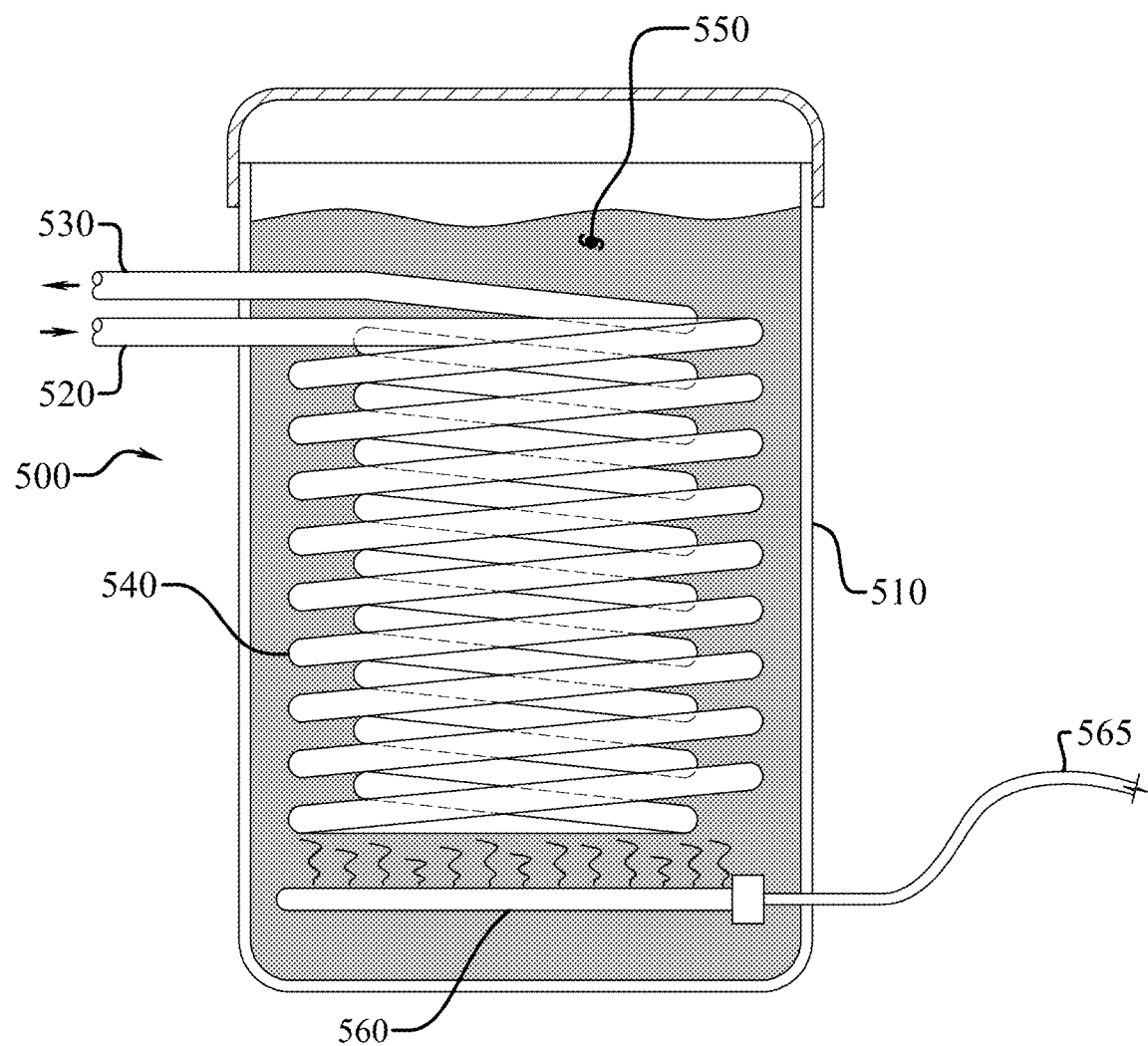
FIG. 29 is a cross-sectional view of an embodiment of a cold brew beverage heating system taken along section line 29-29 in FIG. 28.

In another embodiment of the cold brew beverage dispensing system (600), a cold brew beverage heating system (500) is used to heat the beverage (280), as seen in FIGS. 28 and 29, which is in a closed, or sealed, environment while under pressure. In other words, the beverage is not exposed to the atmosphere during the heating. The a cold brew beverage heating system (500) may include a cold brew beverage heating system container (510); a cold brew beverage heating system inlet (520); a cold brew beverage heating system outlet (530); a heat exchanger coil (540); a thermal conducting liquid (550); and a heat source (560) have a heat source power supply. In this embodiment, the cold brew beverage output port connector (610) is connected to the cold brew heating system inlet (520). The beverage (280) passes through the cold brew beverage heating system (500) and exits the cold brew beverage heating system outlet (530). The dispensing tap line (630), as seen in FIG. 28, is connected cold brew beverage heating system outlet (530). Furthermore, the opposite end of the dispensing tap line (640) is connected to the dispensing tap (630). Once a valve in the dispensing tap (630) is opened, the beverage (280) will flow from the cold brew beverage outlet port (330) through the beverage supply line (610) into the cold brew beverage heating system (500) then into the dispensing tap line (630) and out of the dispensing tap (630). In one embodiment the entry and/or exit to the heat exchanger coil (540) is located at the top of the heat exchanger coil (540) to reduce the risk of the contents draining from the coil when it is not under pressure.

Now referring to the cold brew beverage heating system (500), as seen in FIGS. 28 and 29, the heat exchanger coil (540) is located inside the cold brew heating system container (510). The cold brew heating system inlet (520) and cold brew heating system outlet (530) pass through the side, top, or bottom of the cold brew heating system container (510). The cold brew heating system inlet (520) is connected to the heat exchanger coil (540) located inside of the cold brew heating system container (510) and is immersed in the thermal conducting liquid (550). The opposite end of the heat exchanger coil (540) is connected the cold brew beverage heating system outlet (530). The heat source (550), which may be immersed in the thermal conducting liquid (550), may be positioned below the heat exchange coil (540). The heat source power supply (565) may also pass through the side, bottom, or top of the cold brew heating system container (510), as seen in FIG. 29. The heat source (560) heats the thermal conducting liquid (550) which in turn, heats the beverage (280) passing through the heat exchange coil (540) to provide the end user with a hot beverage (280). In another embodiment of cold brew beverage heating system (500), the temperature of the thermal conducting liquid may be regulated with a PID controller. In yet another embodiment, the beverage (280) temperature exiting the heat exchange coil (540) may be controlled by a PID controller. The cold brew beverage heating system (500) may incorporate an autofill system to maintain a predetermined amount of thermal conducting liquid (550) in the heating system (500) and account for evaporation.

The thermal conducting liquid (550) is preferably maintained at a temperature of no more than 200 degrees Fahrenheit, and no more than 190 degrees Fahrenheit in another embodiment, and no more than 180 degrees Fahrenheit in yet another embodiment. Further, the volume of the thermal conducting liquid (550), as well as the internal volume of the heat exchanger coil (540), are essential in providing the heat transfer capabilities to serve several consecutive cups, while conserving space, and not heating the product so quickly as to adversely impact the taste. In a preferred embodiment the temperature of the beverage leaving the heating system (500) is no more than 180 degrees Fahrenheit, while in a further embodiment it is no more than 170 degrees Fahrenheit, and in yet another embodiment it is no more than 165 degrees Fahrenheit. A preferred balance of all these variables has provided unexpected results when the volume of the thermal conducting liquid (550) is 7-40 times the beverage volume within the heating system (500), and 10-35 times in a further embodiment, and 15-30 times in yet another embodiment. Unlike many systems, the goal of the present heating system is not to simply maximize heat transfer and temperature rise, rather to control the rate of the temperature rise and the volume of the heated beverage so as to not negatively impact the taste of the beverage. In a further embodiment the flowrate of the beverage through the heating system (500) is controlled so that the temperature rise is no more than 20 degrees Fahrenheit per second, and no more than 15 degrees Fahrenheit per second in another embodiment, and no more than 10 degrees Fahrenheit per second in yet another embodiment. However, another series of embodiments sets a floor for the rate of temperature rise so achieve a system that is not unduly large, namely in one embodiment the temperature rise is at least 4 degrees Fahrenheit per second, and at least 6 degrees Fahrenheit per second in another embodiment, and at least 8 degrees Fahrenheit per second in still a further embodiment. In one embodiment the heat exchanger coil (540) is constructed of at least 25 linear feet of ¼" diameter stainless steel tubing, while in another embodiment it is constructed of at least 40 linear feet of ¼" diameter stainless steel tubing, and further embodiments are constructed of ⅜" tubing of like lengths. Further, in another embodiment the volume of the thermal conducting liquid (550) is at least 25 cups, and at least 35 cups in another embodiment, and at least 45 cups in still a further embodiment. The beverage within the heat exchanger coil (540) is under a pressure of at least 15 psig, and at least 20 psig in another embodiment, and at least 25 psig in yet another embodiment. In a further series of embodiments the beverage within the heat exchanger coil (540) is under a pressure of no more than 75 psig, and not more than 60 psig in another embodiment, and no more than 50 psig in yet another embodiment.

In another embodiment, not illustrated, of the cold brew beverage dispensing system (600), a chiller is used to cool the beverage (280). The beverage (280) passes through the chiller and into the dispensing tap line (630), with the opposite end of the dispensing tap line (630) being connected to the dispensing tap (630). Once a valve in the dispensing tap (630) is opened, the beverage (280) will flow from the cold brew beverage storage system's (300) cold brew beverage outlet port (330) through the beverage supply line (610) into the chiller system then into the dispensing tap line (630) and out of the dispensing tap (630).

The method and apparatuses used in cold brewing coffee and tea products are filled with unique and nonobvious relationships among variables that significantly impact the taste and quality of the finished beverage product, and are often inconsistent with traditional cold brew steeping methods. For instance, in one embodiment bitterness is reduced and flavor and odor are enhanced when the water (126) entering the beverage percolation system (200), whether coming from the water vat (120) or a supply line, is no more than 44 degrees Fahrenheit, and no more than 40 degrees Fahrenheit in another embodiment, and 34-38 degrees Fahrenheit in another embodiment. In still another embodiment it is preferable that the water (126) is maintained at these disclosed temperatures for at least 30 minutes prior to entry into the beverage percolation system (200), and at least 60 minutes in another embodiment, and at least 120 minutes in still a further embodiment. In fact, in one embodiment the water vat (120) incorporates a temperature sensor that only allows flow from the water control valve (122) when it meets predetermined conditions, such as those just disclosed.

In another embodiment the beverage percolation system (200) is stored and utilized in an environment maintained at no more than 44 degrees Fahrenheit, and no more than 40 degrees Fahrenheit in another embodiment, and 34-38 degrees Fahrenheit in another embodiment. In still another embodiment it is preferable that the contents of the beverage percolation system (200), specifically the flavoring agents, are maintained at the disclosed temperatures for at least 30 minutes before production begins, an at least 60 minutes in a further embodiment, and at least 90 minutes in still a further embodiment. In still a further embodiment, the water used to hydrate the layer, or layers, of flavoring agents, as previously explained and illustrated in FIGS. 4, 6, 8, and 10, is no more than 44 degrees Fahrenheit, and no more than 40 degrees Fahrenheit in another embodiment, and 34-38 degrees Fahrenheit in another embodiment. In still a further embodiment the flavoring agents are maintained at these temperatures for at least 30 minutes prior to production, and at least 60 minutes in another embodiment, and at least 90 minutes in a still further embodiment. In one embodiment the quantity of water used to hydrate the layer, or layers, of flavoring agents is at least two cups of water per pound of flavoring agent, and is at least four cups of water per pound in a further embodiment, and is four to eight cups of water per pound in still another embodiment. In one embodiment the top layer is created to provide a substantially horizontal flat top surface, while the bottom surface of the lowest layer, or a portion of it, is not parallel to the substantially horizontal flat top surface, as seen in FIG. 18 and applies equally to all of the other embodiments. A benefit of the substantially horizontal flat top surface is that the it reduces the likelihood of the formation of a path of least resistance for the water entering the beverage percolation system (200).

In yet another embodiment the filling and nitrogen introduction of the beverage storage system (300) occurs when the temperature of the beverage is no more than 44 degrees Fahrenheit, and no more than 40 degrees Fahrenheit in another embodiment, and 34-38 degrees Fahrenheit in another embodiment. In still a further embodiment a volume of gas is vented from the beverage storage system (300) via the storage system vent (350) while the nitrogen source (410) is in fluid communication with the beverage (280), and the vented gas volume is at least 2.5% of the beverage volume, and at least 5% in another embodiment, and at least 7.5% in still a further embodiment. Further, the nitrogen fill dispensing stone (326) plays an important role in charging the beverage with the nitrogen, and in one embodiment the nitrogen fill dispensing stone (326) has a porosity of 2 micron or less, and 1 micron or less in another embodiment, and 0.5 micron or less in still a further embodiment. In still another embodiment the nitrogen fill dispensing stone (326) is positioned such that it is at least six inches below the surface of the beverage, and at least twelve inches in another embodiment, and at least eighteen inches in still a further embodiment. Such nitrogenation results in a creamier beverage with a nice head and cascading effect that cold brew coffee drinkers prefer, particularly when introduced to the beverage at low temperature with small porosity nitrogen fill dispensing stones (326). The disclosed porosity provides preferred bubble size, which leads to increased foam stability, and thus a longer lasting head not found in cold brew beverages. A nitrogenated cold brew beverage has less carbon dioxide than conventional carbonated cold brew products, and therefore less carbon dioxide to react with the water contained in the cold brew beverage. After all, nitrogen is very inert and using the disclosed purging method the majority of non-nitrogen gases are expelled from the beverage storage system (300), which combined with the fact that nitrogen is approximately fifty times less soluble in water than carbon dioxide, leads to slow bubble growth and incredibly small bubbles unseen in cold brew beverages, which makes the present beverage particularly suitable for mixed beverage combinations, which in one embodiment includes an alcoholic beverage of at least 10% by volume, and 15% in another embodiment, and 20% in still a further embodiment. In one particular embodiment a preferential head on the cold brew beverage, as well as preferred cascading properties, are achieved by incorporating a faucet restrictor plate, and in some embodiments a flow straightener, in the dispensing tap (630). The restrictor plate contains a plurality of small apertures or restrictors subject the beverage to cavitation and assist in liberating the dissolved gases to form or assist in the formation of a froth or head on the dispensed beverage and improve the cascading bubbles within the beverage once dispensed into a clear glass. In one embodiment the restrictor plate contains at least two apertures that are each less than 0.08 inch in diameter, and in another embodiment they are preferably within the range 0.015 to 0.08 inch in diameter. In one particular embodiment the restrictor plate contains at least four apertures of less than 0.08 inch in diameter, and it restricts flow to less than 1 gpm when the beverage pressure is less than 50 psig. The present method and system components achieve the desired head and preferred cascading, both of which may last for as long as 15 minutes after dispensing. Prior art nitrogen introduction has generally occurred in the head space of the vessel, in other words, above the surface of the beverage resulting in little to no nitrogen infusion and bubble sizes that are large and created by rough handling during transit.

Additionally, the flowrate through the beverage percolation system (200), as well as the quantity of the flavoring agent (230) or agents (230, 240), play a critical role in the controlled release of organic compounds such as 5-methyl furfural and acetylmethylcarbinol. A brewing period is the amount of time from water entering the beverage percolation system (200) to the time that it leaves the percolation system discharge control system (270). In one embodiment the brewing period is at least 45 minutes per pound of flavoring agent (230) or agents (230, 240) contained within the beverage percolation system (200), and is at least 60 minutes per pound in another embodiment, and at least 75 minutes per pound in still another embodiment. A further series of embodiment recognize the deleterious effects of too long a brewing period by capping the brewing period at no more than 120 minutes per pound, and no more than 110 minutes per pound in another embodiment, and no more than 100 minutes per pound in still a further embodiment. However, brewing period alone is not dispositive of the quality, rather the contact time with the flavoring agent (230) or agents (230, 240) is critical, with the contact time referring to the time in which the water is moving over, or through, the flavoring agent (230) or agents (230, 240) and specifically excludes time that the flavoring agent (230) or agents (230, 240) are simply soaking in water, something the present method and system aims to selectively control to improve the saturation and flow-through of the flavoring agent (230), or agents (230, 240), as will be described later in greater detail. In one embodiment the contact time is at least 25% of the brewing period, and is at least 45% in another embodiment, and 40-80% in still another embodiment.

As seen in FIG. 13 the beverage percolation system (200) has a percolation system width (202), which in the case of round tanks is a diameter, and a percolation system depth (204). Further, a beverage percolation system sieve (250) keeps the flavoring agent (230), or agents (230, 240), bound by the flavoring agent retainer (220) and establishing a flavoring agent depth (290), elevated a distance from the bottom of the beverage percolation system (200), referred to as a flavoring agent stand-off (295). In one embodiment the flowrate entering the beverage percolation system (200) is greater than the flowrate leaving the beverage percolation system (200) via the percolation system discharge control system (270), thereby creating an outlet pool depth (282), illustrated in FIGS. 14-16. In one embodiment at least 15% of the brewing period is characterized by an outlet pool depth (282) that is less than flavoring agent stand-off (295), as seen in FIG. 15. As previously described, since the flavoring agent (230), or agents (230, 240), are initially hydrated as described with respect to FIGS. 4, 6, 8, and 10, the water entering the top of the percolation system (200) gradually traverses through the flavoring agent (230), or agents (230, 240), by the influence of gravity and fluid mechanics, although the long brewing period may lead to areas of reduced hydration within the flavoring agent (230), or agents (230, 240), leading to the water more quickly traversing to the bottom of the percolation system (200), and thereby having a reduced contact time. Therefore, in a further embodiment at least 15% of the brewing period is characterized by an outlet pool depth (282) that is equal to, or greater than, the flavoring agent stand-off (295), as seen in FIGS. 14 and 16, thereby reducing the likelihood of dry voids within the flavoring agent (230), or agents (230, 240), and maintaining a desirable contact time. In still an even further embodiment, the negative qualities associated with traditional steeping, or soaking, of the flavoring agent (230), or agents (230, 240), in stagnant water are avoided by ensuring that no more than 75% of the brewing period is characterized by an outlet pool depth (282) that is equal to, or greater than, the flavoring agent stand-off (295), as seen in FIGS. 14 and 16, and no more than 65% in another embodiment, and no more than 55% in still a further embodiment. Another embodiment aimed at maintaining hydration, while reducing the negatives associated with steeping, ensures that during the brewing period the an outlet pool depth (282) never rises high enough to contact an entire horizontal plane of the flavoring agent (230), or agents (230, 240), which for the embodiments of FIGS. 12 and 16 means that the outlet pool depth (282) never reaches the apex of the percolation system sieve (250), or the opposite in the embodiment of FIG. 18. In one particular embodiment the flowrate leaving the water control valve (122) is at least 5% greater than the flowrate leaving the percolation system discharge control system (270), while it is at least 10% greater in another embodiment, and at least 15% greater in still a further embodiment. Another series of embodiments introduces an upper limit on the ranges to provide the desired contact time, specifically in one embodiment the flowrate leaving the water control valve (122) is no more than 40% greater than the flowrate leaving the percolation system discharge control system (270), while in another embodiment it is no more than 30% greater, and no more than 25% greater in still a further embodiment. In one embodiment the water control valve outlet (124) includes at least two drip outlets spaced at least four inches apart, referred to as the separation distance, while in a further embodiment the placement is such that the vertical distance traveled by the water droplets leaving the water control valve outlet (124) to contact with the flavoring agent retainer (220) is at least equal to the separation distance, and is at least 150% of the separation distance in another embodiment, and is no more than the flavoring agent depth (290) in an even further embodiment, and is no more than 75% of the flavoring agent depth (290) in a still further embodiment. The separation distance and free-fall distance alter the extraction of compounds from the flavoring agent and impact the flow path through the flavoring agent. In one particular embodiment the water vat (120) contains a volume of water that is 16-24 gallons, the beverage percolation system (200), which is 12" in diameter and 14" tall contains, contains 6-10 pounds of flavoring agent arranged to have a flavoring agent depth (290) of 4-9", with a vertical thickness of each individual layer of 2-6", and the brewing period is 8-14 hours, and one skilled in the art will appreciate that these relationships may be scaled up, or down, depending on the size of the batch. One embodiment utilizes 0.3-0.5 pounds of flavoring agent for each gallon of finished product. One series of embodiments exhibits preferred brewing period and contact time when the volume of the beverage percolation system (200) is between 125-325 cubic inches per pound of flavoring agent (230), or agents (230, 240), contained in the beverage percolation system (200), while in another embodiment it is 150-300 cubic inches per pound of flavoring agent (230), or agents (230, 240), contained in the beverage percolation system (200), and is 175-275 cubic inches per pound of flavoring agent (230), or agents (230, 240), in yet another embodiment. The flavoring agent depth (290) is preferably at least 4", and at least 6" in a further embodiment, and at least 8" in yet another embodiment.

One skilled in the art will appreciate that there are other methods of achieving the benefits described and illustrated with respect to the curved sieve (250), and are covered by this invention, including, but not limited to, a stepped sieve instead of a curved sieve, wetted wicks that extend downward from a sieve and draw fluid back up to the flavoring agent (230), or agents (230, 240), just to name a few. In one embodiment the radius of curvature of the curved sieve (250) is at least 60% of the percolation system width (202), and is at least 80% of the percolation system width (202) in another embodiment, and is at least 100% of the percolation system width (202) in still another embodiment. In a further series of embodiments the radius of curvature of the curved sieve (250) is no more than 200% of the percolation system width (202), and no more than 180% in another embodiment, and no more than 160% in still a further embodiment. A particularly effective series of embodiments has a radius of curvature of the curved sieve (250) that is at least ¾" per pound of flavoring agent, while in another embodiment the radius of curvature of the curved sieve (250) is ¾-2" per pound of flavoring agent, and in an even further embodiment the radius of curvature of the curved sieve (250) is 1-1.5" per pound of flavoring agent. In still a further embodiment at least 25% of the brewing period is characterized by an outlet pool depth (282) that is less than flavoring agent stand-off (295), as seen in FIG. 15, and at least 35% in another embodiment, and at least 45% in yet another embodiment. Another embodiment aimed at maintaining hydration, while reducing the negatives associated with steeping, ensures that during the brewing period the an outlet pool depth (282) never rises high enough to contact more than 75% of a horizontal plane passing through the flavoring agent (230), or agents (230, 240), while in an even further embodiment it never rises high enough to contact more than 50% of a horizontal plane passing through the flavoring agent (230), or agents (230, 240). In a preferred embodiment the method and system components are configured so that the height of the apex of the sieve (250) is at least 50% greater than the flavoring agent stand-off (295), and is at least 70% in another embodiment, and at least 90% in still another embodiment. In another series of embodiments the height of the apex of the sieve (250) is no more than 200% greater than the flavoring agent stand-off (295), and no more than 175% in another embodiment, and no more than 150% in still another embodiment. The contact time is also dependent upon the flavoring agent depth (290), seen in FIG. 13, which in one embodiment is at least 50% of the percolation system width (202), and is at least 70% in a further embodiment, and at least 90% in yet another embodiment. However, another series of embodiments recognizes that the flavoring agent depth (290) cannot increase without limit, in fact in a preferred embodiment the flavoring agent depth (290) is no more than 200% of the percolation system width (202), and no more than 175% in a further embodiment, and no more than 150% in yet another embodiment. The beverage percolation system sieve (250) preferably has at least 5-95% free area, and less than 75% free area in another embodiment, and no more than 50% free area in still a further embodiment, as the amount a free area impacts the brewing period and the contact time.

All of the prior disclosure also applies to the production of a cold brew nitrogenized tea beverage. The tea production method may further include additional steps that are unique to tea brewing and produce a nitrogenized cold brewed tea having a distinctive flavor not found in conventional hot steeped tea beverages that are eventually served chilled. One such step includes boiling the tea for sterilization, while not negatively impacting the flavor of the final product, which in one embodiment utilizes 1-10 gallons of boiling water per 12 ounces of tea, while in another embodiment utilizes 3-8 gallons of boiling water per 12 ounces of tea, and in still a further embodiment utilizes 4-6 gallons of boiling water per 12 ounces of tea. In another embodiment the tea is boiled for at least 1 minute, while in another embodiment the tea is boiled for at least 3 minutes, and in still another embodiment the tea is boiled for at least 5 minutes. However, the boiling process is preferably no more than 10 minutes, while in another embodiment the boiling process is no more than 8 minutes, and in yet a further embodiment the boiling process is no more than 6 minutes. Limiting the teas time of exposure to high temperature water provides a distinctive flavor and beneficial shelf life attributes.

Another such tea specific step includes dousing the tea in cold water, having a temperature of 44 degrees Fahrenheit or less, within 120 seconds of removing the tea from the boiling water, and within 90 seconds in another embodiment, and within 60 seconds in still a further embodiment. In still another embodiment the tea is placed in cold water within the aforementioned time period, and in one embodiment the tea is placed within a quantity of cold water at a ratio of 2-10 gallons per 12 ounces of tea, and 3-9 gallons per 12 ounces of tea in another embodiment, and 4-7 gallons per 12 ounces of tea in still a further embodiment. The tea is then steeped in cold water, having a temperature of 44 degrees Fahrenheit or less throughout the steeping process, for at least 6 hours, and at least 8 hours in another embodiment, and at least 10 hours in still a further embodiment. In a further series of embodiments the steeping period is limited to avoid negative attributes of overexposure and does so by maintaining a steeping period of more than 20 hours, and no more than 18 hours in another embodiment, and no more than 15 hours in yet another embodiment. In yet a further embodiment the steeping process take place at a temperature of 42 degrees Fahrenheit or less, and 40 degrees Fahrenheit or less in still a further embodiment. Another series of embodiments recognize the deleterious effects of being too cold and avoids such effects with the steeping process taking place at a temperature of at least 34 degrees Fahrenheit, and at least 36 degrees Fahrenheit in still a further embodiment, and at least 38 degrees Fahrenheit in yet another embodiment. The tea is then removed from the tea beverage and the tea beverage is placed in the beverage storage system (300), whereby it may be stored, nitrogenized, dispensed, and/or heated as described in any of the previous embodiments.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A method of making a nitrogenized cold brew beverage, comprising:
    a) cooling a flavoring agent;
    b) supplying water at a supply flowrate to a beverage percolation system (200) having a percolation system discharge control system (270), wherein the percolation system (200) contains the flavoring agent
    c) percolating the water by gravity through the flavoring agent to form a beverage (280);
    d) controlling a discharge flowrate of the beverage (280) from the beverage percolation system (200) with a percolation system discharge control system (270), thereby establishing (i) a brewing period as the amount of time elapsed from when the water enters the beverage percolation system (200) to the time that the beverage (280) leaves the percolation system discharge control system (270), and (ii) a contact time as the amount of time in which the water is moving through the flavoring agent, wherein the brewing period is 45-120 minutes per pound of the flavoring agent;

e) collecting the beverage (280) in a beverage storage system (300) and maintaining the beverage (280) therein;

f) discharging nitrogen into the beverage in the beverage storage system (300) to create the nitrogenized cold brew beverage, wherein the nitrogen is discharged at least six inches from a surface of the beverage in the beverage storage system (300);

g) wherein the supply water, the flavoring agent, and the beverage do not exceed 44 degrees Fahrenheit throughout steps a-f.

2. The method of claim 1, wherein the step of discharging the nitrogen at least six inches from a surface of the beverage in the beverage storage system (300), produces a bubble size of no more than 2 microns through a nitrogen fill dispensing stone (326) located within the beverage and at least six inches from a surface of the beverage, and the nitrogen fill dispensing stone (326) has a porosity of 2 micron or less.

3. The method of claim 1, wherein the contact time is at least 25% of the brewing period.

4. The method of claim 1, wherein the supply flowrate is greater than the discharge flowrate.

5. The method of claim 4, wherein the beverage percolation system (200) includes a beverage percolation system container (210) having a bottom surface, and at least a portion of the flavoring agent is elevated from the bottom surface to define a non-pressurized percolated beverage reservoir (260), wherein a difference between the supply flowrate and the discharge flowrate produces a non-pressurized outlet pool having an outlet pool depth (282) within the percolated beverage reservoir (260).

6. The method of claim 5, wherein all of the flavoring agent is elevated from the bottom surface by a flavoring agent stand-off distance (295), and during at least 15% of the brewing period the outlet pool depth (282) is less than flavoring agent stand-off (295) so the outlet pool does not contact the flavoring agent.

7. The method of claim 6, wherein during no more than 75% of the brewing period the outlet pool depth (282) is equal to, or greater than, the flavoring agent stand-off (295).

8. The method of claim 6, wherein during the entire brewing period the outlet pool depth (282) is less than flavoring agent stand-off (295) so the outlet pool does not contact the flavoring agent during the entire brewing period.

9. The method of claim 4, wherein the supply flowrate is at least 5-40% greater than the discharge flowrate.

10. The method of claim 1, wherein the beverage percolation system (200) contains 0.3-0.5 pounds of flavoring agent per gallon of the beverage.

11. The method of claim 1, wherein the beverage percolation system (200) has a percolation system volume that is 125-325 cubic inches per pound of flavoring agent.

12. The method of claim 1, further including a step of dispensing the nitrogenized cold brew beverage through a dispensing tap (630) having a faucet restrictor plate to liberate dissolved gases from the nitrogenized cold brew beverage.

13. The method of claim 12, wherein the dispensing tap (630) includes a flow straightener, and the faucet restrictor plate restricts a discharge flowrate to less than one gpm at a nitrogenized cold brew beverage pressure of less than 50 psig.

14. The method of claim 12, wherein the faucet restrictor plate contains at least two flow apertures having a diameter of less than 0.08 inches.

15. The method of claim 1, further including a step of heating the nitrogenized cold brew beverage at a rate of no more than 20 degrees Fahrenheit per second in a closed environment while under pressure.

16. The method of claim 15, wherein the nitrogenized cold brew beverage is heated at a rate of at least 4 degrees Fahrenheit per second.

17. A method of making a nitrogenized cold brew beverage, comprising:
   a) cooling a flavoring agent;
   b) supplying water at a supply flowrate to a beverage percolation system (200) having a percolation system discharge control system (270), wherein the percolation system (200) contains the flavoring agent;
   c) percolating the water through the flavoring agent to form a beverage (280);
   d) controlling a discharge flowrate of the beverage (280) from the beverage percolation system (200) with a percolation system discharge control system (270), thereby establishing
      (i) a brewing period as the amount of time elapsed from when the water enters the beverage percolation system (200) to the time that the beverage (280) leaves the percolation system discharge control system (270), and
      (ii) a contact time as the amount of time in which the water is moving through the flavoring agent, wherein the brewing period is 45-120 minutes per pound of the flavoring agent;
   e) collecting the beverage (280) in a beverage storage system (300) and maintaining the beverage (280) therein;
   f) discharging nitrogen through a nitrogen fill dispensing stone (326) into the beverage in the beverage storage system (300) to create the nitrogenized cold brew beverage, wherein the nitrogen fill dispensing stone (326) is located at least six inches from a surface of the beverage in the beverage storage system (300), and the nitrogen fill dispensing stone (326) has a porosity of 2 micron or less; and
   g) wherein the supply water, the flavoring agent, and the beverage do not exceed 44 degrees Fahrenheit throughout steps a-f.

18. The method of claim 17, wherein the beverage percolation system (200) includes a beverage percolation system container (210) having a bottom surface, and at least a portion of the flavoring agent is elevated from the bottom surface to define a percolated beverage reservoir (260), wherein a difference between the supply flowrate and the discharge flowrate produces an outlet pool having an outlet pool depth (282) within the percolated beverage reservoir (260), all of the flavoring agent is elevated from the bottom surface by a flavoring agent stand-off distance (295), and during at least 15% of the brewing period the outlet pool depth (282) is less than flavoring agent stand-off (295) so the outlet pool does not contact the flavoring agent.

19. A method of making a nitrogenized cold brew beverage, comprising:
   a) cooling a flavoring agent;
   b) supplying water at a supply flowrate to a beverage percolation system (200) having a percolation system discharge control system (270), wherein the percolation system (200) contains the flavoring agent;
   c) percolating the water through the flavoring agent to form a beverage (280);
   d) controlling a discharge flowrate of the beverage (280) from the beverage percolation system (200) with a percolation system discharge control system (270), thereby establishing (i) a brewing period as the amount of time elapsed from when the water enters the beverage percolation system (200) to the time that the beverage (280) leaves the percolation system discharge control system (270), and (ii) a contact time as the amount of time in which the water is moving through the flavoring agent, wherein the brewing period is 45-120 minutes per pound of the flavoring agent;

e) collecting the beverage (280) in a beverage storage system (300) and maintaining the beverage (280) therein;

f) discharging nitrogen into the beverage in the beverage storage system (300) to create the nitrogenized cold brew beverage, wherein the nitrogen is discharged at least six inches from a surface of the beverage in the beverage storage system (300);

g) wherein the beverage percolation system (200) includes a beverage percolation system container (210) having a bottom surface, and at least a portion of the flavoring agent is elevated from the bottom surface to define a percolated beverage reservoir (260), wherein a difference between the supply flowrate and the discharge flowrate produces an outlet pool having an outlet pool depth (282) within the percolated beverage reservoir (260), all of the flavoring agent is elevated from the bottom surface by a flavoring agent stand-off distance (295), and during at least 15% of the brewing period the outlet pool depth (282) is less than flavoring agent stand-off (295) so the outlet pool does not contact the flavoring agent; and h) wherein the supply water, the flavoring agent, and the beverage do not exceed 44 degrees Fahrenheit throughout steps a-f.

20. The method of claim 19, wherein during the entire brewing period the outlet pool depth (282) is less than flavoring agent stand-off (295) so the outlet pool does not contact the flavoring agent during the entire brewing period.

* * * * *